United States Patent
Nishio

(10) Patent No.: US 10,816,829 B2
(45) Date of Patent: Oct. 27, 2020

(54) OPTICAL FILM AND METHOD FOR PRODUCING OPTICAL FILM

(71) Applicant: Konica Minolta, Inc., Tokyo (JP)

(72) Inventor: Shoji Nishio, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 616 days.

(21) Appl. No.: 15/513,060

(22) PCT Filed: Oct. 2, 2015

(86) PCT No.: PCT/JP2015/078092
§ 371 (c)(1),
(2) Date: Mar. 21, 2017

(87) PCT Pub. No.: WO2016/052740
PCT Pub. Date: Apr. 7, 2016

(65) Prior Publication Data
US 2017/0307910 A1    Oct. 26, 2017

(30) Foreign Application Priority Data

Oct. 3, 2014    (JP) .................................. 2014-204430

(51) Int. Cl.
*G02F 1/01*    (2006.01)
*G02F 1/00*    (2006.01)
(Continued)

(52) U.S. Cl.
CPC ............ *G02F 1/0147* (2013.01); *B82Y 20/00* (2013.01); *C03C 17/009* (2013.01); *G02B 5/008* (2013.01);
(Continued)

(58) Field of Classification Search
CPC .......... G02F 1/0147; G02F 1/132; G02F 1/19; G02F 1/009; G02F 1/133536;
(Continued)

(56) References Cited

FOREIGN PATENT DOCUMENTS

| | | |
|---|---|---|
| CN | 103221850 A | 7/2013 |
| JP | 2002-086606 A | 3/2002 |

(Continued)

OTHER PUBLICATIONS

Office Action dated Dec. 3, 2018 from the corresponding Chinese Application No. 201580053813.X and English translation.
(Continued)

*Primary Examiner* — Collin X Beatty
*Assistant Examiner* — Grant A Gagnon
(74) *Attorney, Agent, or Firm* — Lucas & Mercanti, LLP

(57) ABSTRACT

An object of the present invention is to provide an optical film which has thermochromic properties that a near-infrared light shielding ratio can be controlled according to temperature environment and which has a low haze and has excellent crack resistance and adhesiveness even when the optical film is used over a long period of time, and a method for producing the same. In the optical film, an optical functional layer has a sea-island structure including a sea region formed by a binder resin and island regions formed by vanadium-dioxide-containing fine particles, a number average particle diameter of total particles including primary particles and secondary particles of the vanadium-dioxide-containing fine particles is 200 nm or less, an average value of a closest wall-to-wall distance between the island regions is in a range of 1 to 1,000 nm, and the number of the island regions having the closest wall-to-wall distance of 1,100 nm or more is 10% by number or less with respect to the total number of the island regions.

20 Claims, 3 Drawing Sheets

(51) Int. Cl.
G02B 5/22 (2006.01)
G02B 5/26 (2006.01)
G02B 5/00 (2006.01)
G02B 5/20 (2006.01)
C03C 17/00 (2006.01)
B82Y 20/00 (2011.01)

(52) U.S. Cl.
CPC .............. *G02B 5/208* (2013.01); *G02B 5/22* (2013.01); *G02B 5/26* (2013.01); *G02F 1/009* (2013.01); *C03C 2217/445* (2013.01); *C03C 2217/475* (2013.01); *G02F 2201/083* (2013.01)

(58) Field of Classification Search
CPC ................ G02F 1/0126; G02F 1/0136; G02F 1/133514; G02F 1/133533; G02F 1/21; G02F 2001/133538; G02F 2001/0139; G02F 1/01; G02F 1/133528; G02F 1/15; G02F 1/29; G02F 2201/346; G02F 2202/36; G02F 1/0081; G02F 1/0121; G02F 1/13725; G02F 1/153; G02F 2001/212; G02F 2201/12; G02F 2201/16; G02F 2201/30; G02F 2202/32; G02F 2203/10; G02F 2203/11; G02F 2203/52; G02F 2203/62; G02F 2/02; G02F 1/0063; G02F 1/0072; G02F 1/0102; G02F 1/0123; G02F 1/0128; G02F 1/025; G02F 1/03; G02F 1/116; G02F 1/13; G02F 1/13338; G02F 1/136209; G02F 1/1396; G02F 1/15165; G02F 1/17; G02F 1/174; G02F 1/218; G02F 1/225; G02F 1/2255; G02F 1/3132; G02F 1/3501; G02F 1/3511; G02F 1/353; G02F 1/3532; G02F 1/3536; G02F 1/365; G02F 1/37; G02F 2001/133545; G02F 2001/133548; G02F 2001/136222; G02F 2001/1518; G02F 2001/213; G02F 2001/215; G02F 2001/3505; G02F 2001/3546; G02F 2201/02; G02F 2201/08; G02F 2201/122; G02F 2201/38; G02F 2201/50; G02F 2202/30; G02F 2203/055; G02F 2203/50; G02F 2203/60; B82Y 20/00; B82Y 15/00; B82Y 30/00; B82Y 40/00; G02B 5/23; G02B 27/28; G02B 5/208; G02B 26/004; G02B 5/0289; G02B 5/3016; G02B 26/007; G02B 26/02; G02B 27/281; G02B 5/223; G02B 5/285; G02B 5/287; G02B 7/008; G02B 13/0045; G02B 13/06; G02B 1/005; G02B 1/02; G02B 1/10; G02B 26/0883; G02B 5/008; G02B 5/0231; G02B 5/0242; G02B 5/0247; G02B 5/0252; G02B 5/0268; G02B 5/0278; G02B 5/0284; G02B 5/0294; G02B 5/206; G02B 5/207; G02B 5/3025; G02B 5/3058; G02B 6/2931; G02B 6/29311; G02B 6/29313; G02B 6/29353; G02B 6/29355; G02B 6/29395; G02B 6/4201; G02B 6/4215; G02B 6/4219; G02B 6/4246
USPC ......................................................... 359/288
See application file for complete search history.

(56) References Cited

FOREIGN PATENT DOCUMENTS

| | | |
|---|---|---|
| JP | 2004-346260 A | 12/2004 |
| JP | 2007-178915 A | 7/2007 |
| JP | 2008-231167 A | 10/2008 |
| JP | 2011-178825 A | 9/2011 |
| JP | 2012-136411 A | 7/2012 |
| JP | 2013-184091 A | 9/2013 |
| WO | 2013-065679 A1 | 5/2013 |

OTHER PUBLICATIONS

International Search Report dated Dec. 22, 2015 corresponding International Application No. PCT/JP2015/078092 and English translation of International Search Report; Total of 5 pages.

Written Opinion of PCT dated Dec. 22, 2015 from the corresponding International Application No. PCT/JP2015/078092 and English translation of Written Opinion of PCT; Total of 8 pages.

Office Action dated Jun. 25, 2019 from corresponding Japanese Application No. 2016-552185 and English translation.

OPTICAL FILM AND METHOD FOR PRODUCING OPTICAL FILM

CROSS REFERENCE TO RELATED APPLICATION

This Application is a 371 of PCT/JP2015/078092 filed on Oct. 2, 2015 which, in turn, claimed the priority of Japanese Application No. 2014-204430 filed on Oct. 3, 2014, both applications are incorporated herein by reference.

TECHNICAL FIELD

The present invention relates to an optical film for shielding near-infrared light and a method for producing the same. More specifically, the present invention relates to an optical film which has thermochromic properties that a near-infrared light shielding ratio can be controlled according to temperature environment and which has a low haze and has excellent crack resistance and adhesiveness even when the optical film is used over a long period of time, and a method for producing the same.

BACKGROUND ART

In recent years, laminated glasses, which prevent a skin burning sensation caused by external light (sunlight) which enters through a window in automobiles or buildings and have high heat insulating properties or heat shielding properties, are commercially available on the market. With wide spread of electric automobiles or the like, from the viewpoint of enhancing cooling efficiency in vehicles, near-infrared light (heat ray, infrared) shielding films to be applied to laminated glasses have been actively developed these days.

Application of the near-infrared light shielding films to window glasses of vehicle bodies or buildings enables a load to cooling equipment such as an in-vehicle air conditioner to be reduced. Therefore, the near-infrared light shielding films are effective means as energy saving measures.

As such a near-infrared light shielding film, an optical film including a conductive body such as tin-doped indium oxide (ITO) as an infrared absorbing material is disclosed. In addition, JP 2010-222233 A discloses a near-infrared light shielding film including a functional plastic film which has an infrared reflecting layer and an infrared absorbing layer.

Meanwhile, a near-infrared light shielding film is proposed which has a reflection layer laminate body obtained by alternately laminating a plurality of low refractive index layers and high refractive index layers and selectively reflects near-infrared light by adjusting the layer thickness of each refractive index layer (for example, see Patent Literature 1).

The near-infrared light shielding film with such a configuration exhibits preferable effect by high near-infrared light shielding effect of the near-infrared light shielding film in a low-latitude region near the equator with high illuminance of sunlight. However, in the period of winter in mid-latitude to high-latitude regions, conversely, incident light beams are shielded without exception even when sunlight is desired to be incorporated in vehicles or rooms as much as possible. Thus, there is a problem that the insides of vehicles or rooms are not warmed.

In view of the above problems, a method of applying a thermochromic material, which is capable of controlling optical properties of near-infrared light such as shielding and transmitting of near-infrared light by temperature, to the near-infrared light shielding films has been studied. As a typical material thereof, vanadium dioxide (hereinafter, also referred to as "$VO_2$") is mentioned. It is known that $VO_2$ causes phase transition in a temperature range near 60° C. and shows thermochromic properties.

That is, by using an optical film utilizing the properties of $VO_2$, properties of shielding near-infrared light causing heat when temperature increases and transmitting near-infrared light in low temperature environment can be exhibited. Accordingly, in hot summer, near-infrared light is shielded to suppress an increase in temperature in the room; meanwhile, in cold winter, light energy can be incorporated from the outside.

As specific examples of $VO_2$ having such properties, a method of obtaining fine nanoparticles of vanadium dioxide ($VO_2$) by using a vanadium compound and hydrazine or a hydrate thereof and by using a hydrothermal synthesis method is disclosed (for example, see Patent Literature 2). In addition, a method capable of providing a thermochromic film by dispersing $VO_2$ nanoparticles prepared by the hydrothermal synthesis method in a transparent resin to form a laminate body in which a $VO_2$-dispersed resin layer is formed on a resin substrate is disclosed (for example, see Patent Literature 3).

However, it is found out that when an optical functional film exhibiting thermochromic properties is formed by filtering and drying $VO_2$-containing fine particles after the particles are synthesized or by using a solvent-based coating liquid prepared with a binder insoluble in an aqueous solvent, primary particles of $VO_2$-containing fine particles are aggregated and thus aggregated secondary particles are easily generated. In particular, secondary particles of the $VO_2$-containing fine particles prepared with going through a drying step once remain in the formed optical functional film as secondary particles in an aggregated state without the aggregation being completely dissolved to obtain primary particles even when a general dispersing treatment is performed. If such secondary particles are present in the optical functional film, at the time of long-term use under environment in which temperature or humidity largely varies, it is found out that cracks or film peeling occurs at a portion of the agglomeration of the aggregated secondary particles serving as a start point. Further, when there are a lot of such aggregated secondary particles, a haze of the optical film increases. Thus, there is a demand for development of an optical film having thermochromic properties and being excellent in durability (crack resistance and adhesiveness) and haze resistance.

Further, as the free-electron behavior on surface of metal fine particles, it is known that with miniaturization of the surface area, for example, metal fine particles are excited by energy of photon injection on the surface of metal fine particles having size of the order of nanometers, and light absorption or light scattering occurs near visible light or near-infrared light (surface plasmon resonance (SPR, surface plasma resonance)). Further, it is known that SPR phenomenon of metal fine particles, that is, the wavelength (λSPR) indicating a peak value of abnormal absorption or scattering thereof varies largely depending on the type, composition, size, shape, and spatial distribution of metal fine particles as well as an intervening medium (for example, see Patent Literature 4).

CITATION LIST

Patent Literature

Patent Literature 1: WO 2013/065679 A
Patent Literature 2: JP 2011-178825 A

Patent Literature 3: JP 2013-184091 A
Patent Literature 4: JP 2004-346260 A

SUMMARY OF INVENTION

Technical Problem

The present invention has been made in view of the above-described problems, and an object thereof is to provide an optical film which has thermochromic properties that a near-infrared light shielding ratio can be controlled according to temperature environment and which has a low haze and has excellent crack resistance and adhesiveness even when the optical film is used over a long period of time, and a method for producing the same.

Solution to Problem

The present inventors have conducted extensive investigation in view of the above-described problems, and as a result, found that, in an optical film including an optical functional layer containing at least vanadium-dioxide-containing fine particles and a binder resin, when the optical functional layer has a sea-island structure including a sea region formed by the binder resin and island regions formed by the vanadium-dioxide-containing fine particles and the size of the island regions and the inter-particle distance are adjusted to a specific range, the near-infrared light shielding ratio can be controlled according to temperature environment by SPR phenomenon occurring when $VO_2$ fine particles having thermochromic properties have metallic nature in high temperature. The reason for this is estimated that the optical functional layer enables an electromagnetic wave treatment (plasmon reflection, plasmon absorption) by vanadium-dioxide-containing fine particles in high temperature to be optimized so that the electromagnetic wave energy can be efficiently dispersed and the electromagnetic wave passing through the optical film can be minimized. Accordingly, the present inventors found that it is possible to provide an optical film which has thermochromic properties that a near-infrared light shielding ratio can be controlled according to temperature environment and which has a low haze and has excellent crack resistance and adhesiveness even when the optical film is used over a long period of time, and a method for producing the same, and have achieved the present invention.

That is, the above-described problems of the present invention are solved by the following means.

1. An optical film including an optical functional layer containing at least vanadium-dioxide-containing fine particles and a binder resin, wherein
the optical functional layer has a sea-island structure including a sea region formed by the binder resin and island regions formed by the vanadium-dioxide-containing fine particles,
a number average particle diameter of total particles including primary particles and secondary particles of the vanadium-dioxide-containing fine particles is 200 nm or less, and
an average value of a closest wall-to-wall distance between the island regions is in a range of 1 to 1,000 nm, and the number of the island regions having the closest wall-to-wall distance of 1,100 nm or more is 10% by number or less with respect to the total number of the island regions.

2. The optical film according to Item. 1, wherein a ratio of the number of primary particles of the vanadium-dioxide-containing fine particles in the optical functional layer is 25% by number or more of the number of total particles.

3. The optical film according to Item. 1 or 2, wherein the vanadium-dioxide-containing fine particles are vanadium-dioxide-containing fine particles prepared by an aqueous synthesis method and the binder resin is an aqueous binder resin.

4. The optical film according to Item. 1 or 2, wherein the vanadium-dioxide-containing fine particles are vanadium-dioxide-containing fine particles prepared by an aqueous synthesis method and the binder resin is a hydrophobic binder resin.

5. The optical film according to any one of Items. 1 to 4, further including a near-infrared light shielding layer having a function of shielding at least a part of light in a wavelength range of 700 to 1,000 nm in addition to the optical functional layer.

6. A method for producing an optical film, the method including a step of forming an optical functional layer containing at least vanadium-dioxide-containing fine particles and a binder resin, wherein
in the step,
the optical functional layer has a sea-island structure including a sea region formed by the binder resin and island regions formed by the vanadium-dioxide-containing fine particles,
a number average particle diameter of total particles including primary particles and secondary particles of the vanadium-dioxide-containing fine particles is 200 nm or less, and
an average value of a closest wall-to-wall distance between the island regions is 1 to 1,000 nm, and the number of the island regions having the closest wall-to-wall distance of 1,100 nm or more is adjusted to 10% by number or less with respect to the total number of the island regions.

7. The method for producing an optical film according to Item. 6, wherein vanadium-dioxide-containing fine particles prepared by an aqueous synthesis method are used as the vanadium-dioxide-containing fine particles and the binder resin is an aqueous binder resin.

8. The method for producing an optical film according to Item. 7, wherein the vanadium-dioxide-containing fine particles are prepared as an aqueous dispersion liquid containing vanadium-dioxide-containing fine particles by the aqueous synthesis method, an aqueous coating liquid for forming an optical functional layer is prepared by mixing, without going through a dried state, the aqueous dispersion liquid with an aqueous binder resin solution in which at least the aqueous binder resin is dissolved in an aqueous solvent, and the coating liquid for forming an optical functional layer is applied onto a transparent substrate by a wet coating method and then dried to produce an optical film.

9. The method for producing an optical film according to Item. 6, wherein vanadium-dioxide-containing fine particles prepared by an aqueous synthesis method are used as the vanadium-dioxide-containing fine particles, and
a hydrophobic binder resin is used as the binder resin.

10. The method for producing an optical film according to Item. 9, wherein a resin polymerized in a curing treatment step by using a monomer constituting the hydrophobic binder resin is used as the hydrophobic binder resin.

11. The method for producing an optical film according to Item. 9 or 10, wherein the vanadium-dioxide-containing fine particles are prepared as an aqueous dispersion liquid containing vanadium-dioxide-containing fine particles by the aqueous synthesis method and then the aqueous dispersion liquid is prepared as a solvent dispersion liquid containing vanadium-dioxide-containing fine particles by a solvent replacement step without the vanadium-dioxide-containing fine particles going through a dried state.

12. The method for producing an optical film according to Item. 11, wherein the solvent replacement step includes:
   a concentrating step of a dispersion liquid containing vanadium-dioxide-containing fine particles; and
   a solvent dilution step of a concentrated liquid obtained in the concentrating step, and
   the solvent replacement step is a step of preparing a solvent dispersion liquid containing vanadium-dioxide-containing fine particles by repeating treatment operations in the concentrating step and the solvent dilution step two or more times.

13. The method for producing an optical film according to Item. 12, wherein a concentrating means used in the concentrating step of a dispersion liquid containing vanadium-dioxide-containing fine particles is an ultrafiltration method.

14. The method for producing an optical film according to any one of Items. 11 to 13, wherein the solvent dispersion liquid containing vanadium-dioxide-containing fine particles prepared by the solvent replacement step contains water in a range of 0.1 to 5.0% by mass.

15. The method for producing an optical film according to anyone of Items. 11 to 14, wherein a coating liquid for forming an optical functional layer which contains the solvent dispersion liquid containing vanadium-dioxide-containing fine particles prepared by the solvent replacement step and a hydrophobic binder resin is prepared, and the coating liquid for forming an optical functional layer is applied onto a transparent substrate and then dried to form an optical functional layer.

16. The method for producing an optical film according to any one of Items. 11 to 14, wherein a dope for forming an optical functional layer which contains the solvent dispersion liquid containing vanadium-dioxide-containing fine particles prepared by the solvent replacement step and a hydrophobic binder resin is prepared, and the dope for forming an optical functional layer is used to form an optical functional layer by a solution casting method.

17. The method for producing an optical film according to any one of Items. 6 to 16, wherein a near-infrared light shielding layer having a function of shielding at least a part of light in a wavelength range of 700 to 1,000 nm is formed in addition to the optical functional layer.

Advantageous Effects of Invention

According to the above-described means of the present invention, it is possible to provide an optical film which has thermochromic properties that a near-infrared light shielding ratio can be controlled according to temperature environment and which has a low haze and has excellent crack resistance and adhesiveness even when the optical film is used over a long period of time, and a method for producing the same.

Although the mechanism and the action attaining the object and advantageous effects of the present invention are not clarified, the present inventors infer as follows.

The present inventors have discovered dependency between the particle diameter and the inter-particle distance in the SPR phenomenon occurring when $VO_2$ fine particles having thermochromic properties have metallic nature in high temperature, and have achieved the present invention.

That is, the present inventors found that, in the optical functional layer having a sea-island structure including a sea region formed by the binder resin and island regions formed by the vanadium-dioxide-containing fine particles, when a number average particle diameter of total particles including primary particles and secondary particles of the vanadium-dioxide-containing fine particles is 200 nm or less, an average value of a closest wall-to-wall distance between the island regions is in a range of 1 to 1,000 nm, and the number of the island regions having the closest wall-to-wall distance of 1,100 nm or more is 10% by number or less with respect to the total number of the island regions, an electromagnetic wave treatment (plasmon reflection, plasmon absorption) by vanadium-dioxide-containing fine particles in high temperature can be optimized so that the electromagnetic wave energy can be efficiently dispersed and the electromagnetic wave passing through the optical film can be minimized. As a result, the present inventors found that it is possible to exhibit thermochromic properties that a near-infrared light shielding ratio can be controlled according to temperature environment, and have achieved the present invention.

DESCRIPTION OF EMBODIMENTS

Figure 1:
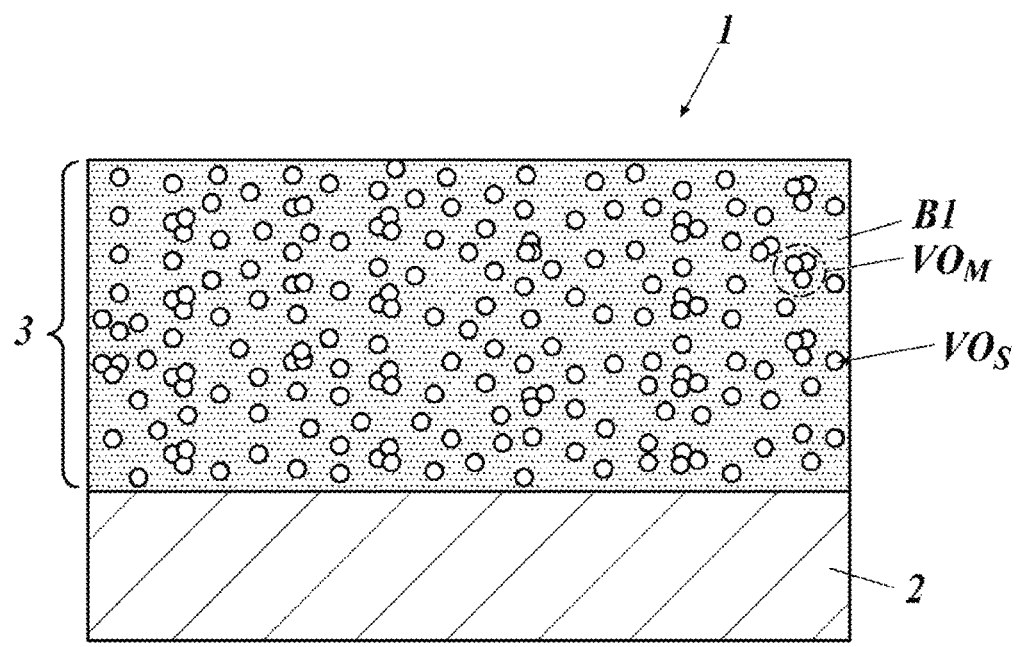
FIG. 1 is a schematic cross-sectional view illustrating an example of a basic configuration of an optical film of the present invention.

An optical film of the present invention is an optical film including an optical functional layer containing at least vanadium-dioxide-containing fine particles and a binder resin, in which the optical functional layer has a sea-island structure including a sea region formed by the binder resin and island regions formed by the vanadium-dioxide-containing fine articles, a number average particle diameter of total particles including primary particles and secondary particles of the vanadium-dioxide-containing fine particles is 200 nm or less, and an average value of a closest wall-to-wall distance between the island regions is in a range of 1 to 1,000 nm, and the number of the island regions having the closest wall-to-wall distance of 1,100 nm or more is 10% by number or less with respect to the total number of the island regions. This technical feature is common through the inventions according to claim 1 to claim 15.

In an embodiment of the present invention, the ratio of the number of primary particles of vanadium-dioxide-containing fine particles in the optical functional layer is preferably 25% by number or more of the number of total particles from the viewpoint that more excellent storage stability under high humidity environment and high change rates of infrared transmitting effect and infrared shielding effect at the time of temperature change can be achieved.

Further, it is preferable that the vanadium-dioxide-containing fine particles are vanadium-dioxide-containing fine particles prepared by an aqueous synthesis method and the binder resin is an aqueous binder resin, from the viewpoint that crack resistance and adhesiveness can be further improved.

Further, it is preferable that the vanadium-dioxide-containing fine particles are vanadium-dioxide-containing fine particles prepared by an aqueous synthesis method and the binder resin is a hydrophobic binder resin, from the viewpoint that crack resistance and adhesiveness can be further improved.

Further, it is preferable to use, as the hydrophobic binder resin, a resin polymerized in a curing treatment step by using a monomer constituting the hydrophobic binder resin, from the viewpoint that the optical functional layer can be stably formed.

Further, by providing a near-infrared light shielding layer having a function of shielding at least a part of light in a wavelength range of 700 to 1,000 nm in addition to the optical functional layer, the light reflection effect by a reflection layer laminate body can be provided in addition to the near-infrared light shielding effect by the vanadium-dioxide-containing fine particles, and higher near-infrared light shielding effect can be obtained.

Further, a method for producing an optical film of the present invention is a method for producing an optical film, the method including a step of forming an optical functional layer containing at least vanadium-dioxide-containing fine particles and a binder resin. In the step, the optical functional layer has a sea-island structure including a sea region formed by the binder resin and island regions formed by the vanadium-dioxide-containing fine particles, a number average particle diameter of total particles including primary particles and secondary particles of the vanadium-dioxide-containing fine particles is 200 nm or less, an average value of a closest wall-to-wall distance between the island regions is 1 to 1,000 nm, and the number of the island regions having the closest wall-to-wall distance of 1,100 nm or more is adjusted to 10% by number or less with respect to the total number of the island regions.

Further, in the method for producing an optical film of the present invention, it is preferable that the vanadium-dioxide-containing fine particles are prepared as an aqueous dispersion liquid containing vanadium-dioxide-containing fine particles by the aqueous synthesis method, an aqueous coating liquid for forming an optical functional layer is prepared by mixing, without going through a dried state, the aqueous dispersion liquid with an aqueous binder resin solution in which at least the aqueous binder resin is dissolved in an aqueous solvent, and the coating liquid for forming an optical functional layer is applied onto the transparent substrate by a wet coating method and then dried to produce an optical film, from the viewpoint that the condition that the number average particle diameter of total particles including primary particles and secondary particles of the vanadium-dioxide-containing fine particles defined in the present invention is adjusted to 200 nm or less can be achieved reliably without generation of an aggregate of the vanadium-dioxide-containing fine particles and an optical film with excellent crack resistance and adhesiveness can be obtained.

Further, in the method for producing an optical film of the present invention, it is preferable that the vanadium-dioxide-containing fine particles are prepared as an aqueous dispersion liquid containing vanadium-dioxide-containing fine particles by the aqueous synthesis method and then the aqueous dispersion liquid is prepared as a solvent dispersion liquid containing vanadium-dioxide-containing fine particles by a solvent replacement step without the vanadium-dioxide-containing fine particles going through a dried state, from the viewpoint that the condition that the number average particle diameter of total particles including primary particles and secondary particles of the vanadium-dioxide-containing fine particles defined in the present invention is adjusted to 200 nm or less can be achieved reliably without generation of an aggregate of the vanadium-dioxide-containing fine particles and an optical film with excellent crack resistance and adhesiveness can be obtained.

Further, it is preferable that the solvent replacement step includes a concentrating step of a dispersion liquid containing vanadium-dioxide-containing fine particles, and a solvent dilution step of a concentrated liquid obtained in the concentrating step, and the solvent replacement step is a step of preparing a solvent dispersion liquid containing vanadium-dioxide-containing fine particles by repeating treatment operations in the concentrating step and the solvent dilution step two or more times or a concentrating means used in the concentrating step is an ultrafiltration method, from the viewpoint that a solvent-based dispersion liquid in which the water content ratio is reliably controlled to a specific range can be prepared.

Further, it is preferable that the solvent dispersion liquid containing vanadium-dioxide-containing fine particles prepared by the solvent replacement step contains water in a range of 0.1 to 5.0% by mass, from the viewpoint that an optical film having large change rates of infrared transmitting effect and infrared shielding effect at the time of temperature change can be stably produced.

Further, a method in which a coating liquid for forming an optical functional layer which contains the solvent dispersion liquid containing vanadium-dioxide-containing fine particles prepared by the solvent replacement step and a hydrophobic binder resin is prepared, and the coating liquid for forming an optical functional layer is applied onto a transparent substrate and then dried to form an optical functional layer or a method in which a dope for forming an optical functional layer which contains the solvent dispersion liquid containing vanadium-dioxide-containing fine particles prepared by the solvent replacement step and a hydrophobic binder resin is prepared, and the dope for forming an optical functional layer is used to form an optical functional layer by a solution casting method is preferable, from the viewpoint that an optical film which has thermochromic properties that a near-infrared light shielding ratio can be controlled according to temperature environment, has a low haze, is excellent in storage stability under high humidity environment, and has large change rates of infrared transmitting effect and infrared shielding effect at the time of temperature change.

Hereinafter, the present invention and its constituent elements, and embodiments and aspects for carrying out the present invention will be described in detail. Incidentally, the numerals before and after "to" described in the following description are included as the lower limit value and the upper limit value.

<<Outline of Layer Configuration of Optical Film>>

The optical film of the present invention is an optical film including an optical functional layer containing at least vanadium-dioxide-containing fine particles and a binder resin, in which the optical functional layer has a sea-island structure including a sea region formed by the binder resin and island regions formed by the vanadium-dioxide-containing fine particles, a number average particle diameter of total particles including primary particles and secondary particles of the vanadium-dioxide-containing fine particles is 200 nm or less, an average value of a closest wall-to-wall distance between the island regions is in a range of 1 to 1,000 nm, and the number of the island regions having the closest wall-to-wall distance of 1,100 nm or more is 10% by number or less with respect to the total number of the island regions.

In the present application, the term "sea-island structure" refers to a structure in which, when a plurality of components which are immiscible to each other (for example, a binder resin and inorganic fine particles) are mixed, as a higher order structure of the mixture, the binder resin components are dispersed in a continuous phase and the other components are dispersed in an island form or a particulate form. That is, the sea-island structure refers to a structure formed in such a manner that the binder resin becomes a continuous phase (matrix) corresponding to sea and the fine particles becomes a disperse phase corresponding to islands.

A typical configuration example of the optical film of the present invention will be described with reference to drawings.

A preferred aspect of the optical film of the present invention is a configuration in which an optical functional layer according to the present invention is formed on a transparent substrate.

FIG. 1 is a schematic cross-sectional view illustrating an example of a basic configuration of an optical film including an optical functional layer according to a first embodiment which contains vanadium-dioxide-containing fine particles and a binder resin defined in the present invention.

An optical film 1 illustrated in FIG. 1 has a configuration in which an optical functional layer 3 is laminated on a transparent substrate 2. The optical functional layer 3 according to the first embodiment is present in a state in which vanadium-dioxide-containing fine particles are dispersed in a binder resin B1 contained in the optical functional layer according to the present invention. In the vanadium-dioxide-containing fine particles, primary particles $VO_S$ of vanadium dioxide in which vanadium-dioxide-containing fine particles are independently present and secondary particles $VO_M$ of vanadium dioxide which constitute an aggregation (also referred to as an aggregate) of two or more vanadium-dioxide-containing fine particles are present. In the present invention, the aggregation of two or more vanadium-dioxide-containing fine particles is generally referred to as secondary particles, and also referred to as a secondary particle aggregate or secondary aggregated particles.

In the present invention, the primary particles $VO_S$ and the secondary particles $VO_M$ of vanadium dioxide are island regions formed by the vanadium-dioxide-containing fine particles (hereinafter, also simply referred to "island regions").

In the present invention, the number average particle diameter of total particles including the primary particles $VO_S$ and the secondary particles $VO_M$ of the vanadium-dioxide-containing fine particles in the optical functional layer 3 is preferably 200 nm or less. In this way, when the number average particle diameter of total particles including the primary particles $VO_S$ and the secondary particles $VO_M$ of the vanadium-dioxide-containing fine particles in the optical functional layer 3 is 200 nm or less, an optical film with a large change in infrared transmission-shield at the time of temperature change is obtained. The reason for this is estimated that transition of crystals on the surfaces of the vanadium-dioxide-containing fine particles more easily occurs by temperature change as compared to an internal structure so that a change in infrared transparency and infrared shielding ratio of the optical functional layer containing vanadium-dioxide-containing fine particles is increased by environmental temperature change. That is, when the number average particle diameter of the vanadium-dioxide-containing fine particles is adjusted to 200 nm or less, the area ratio of particle surface is increased. On the other hand, it is estimated that, since the area ratio of surfaces in particles with a primary particle diameter of more than 200 nm is decreased, even when the primary particle diameter is 200 nm or less, the particles are secondarily aggregated, and in the case of strong aggregation with a number average particle diameter of more than 200 nm, interaction on the surface between the primary particles becomes strong and a variation width of infrared transparency and infrared shielding ratio at the time of temperature change is decreased.

The number average particle diameter of the vanadium-dioxide-containing fine particles in the optical functional layer can be obtained according to the following method.

First, the side surface of the optical functional layer 3 constituting the optical film 1 is trimmed by a microtome to expose the cross-section as illustrated in FIG. 1. Next, the exposed cross-section is captured using a transmission electron microscope (TEM) with a magnification of 10,000 to 100,000. The particle diameters of the whole vanadium-dioxide-containing fine particles present in a certain region of the captured cross-section are measured. At this time, the number of the vanadium-dioxide-containing fine particles to be measured is preferably in a range of 50 to 100. In the captured particles, as illustrated in FIG. 1, the primary particles that are single particles and secondary particles that are an aggregate of two or more particles are included, and the particle diameters of the primary particles $VO_S$ of vanadium dioxide are obtained by measuring the diameters of respective particles which are separated and independently present. If the particles do not have a spherical form, the projected areas of the particles are converted into a circle, and the diameter thereof is used as the particle diameter. On the other hand, regarding vanadium dioxide in which two or more particles are aggregated and present, the projected area of the entire aggregate is obtained, the projected area is converted into a circle, and the diameter thereof is used as the particle diameter. The number average diameter of each diameter of the primary particles and the secondary particles obtained as described above is obtained. Since there is a variation in particle distribution in the cut cross-sectional portion, the measurement as described above is performed on ten different cross-sectional regions to obtain a number average diameter of the entire particle and the obtained number average diameter is used as a number average particle diameter (nm).

The details of the vanadium-dioxide-containing fine particles according to the present invention will be described below, but the preferable particle diameter of primary particles is in a range of 10 to 100 nm. Therefore, the preferable particle diameter of secondary particles varies depending on the number of particles to be aggregated, but is roughly in a range of 50 to 200 nm.

In the optical film of the present invention, in addition to the optical functional layer according to the present invention, a near-infrared light shielding layer having a function of shielding at least a part of light in a wavelength range of 700 to 1,000 nm may be included.

Another preferred aspect of the optical film of the present invention is a hybrid configuration in which the optical functional layer also serves as a resin substrate.

Figure 2:
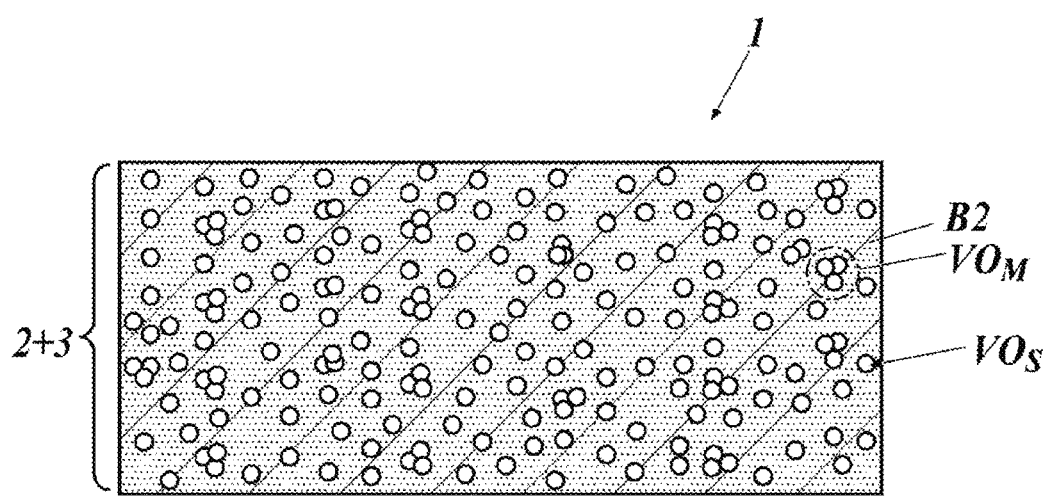
FIG. 2 is a schematic cross-sectional view illustrating another example of the basic configuration of the optical film of the present invention.

FIG. 2 is a schematic cross-sectional view illustrating another example of the basic configuration of the optical film of the present invention. The optical film is configured by a hybrid optical functional layer (2+3) that is a second embodiment, is not in a state in which the transparent substrate 2 and the optical functional layer 3 illustrated in FIG. 1 are separated, and is formed by the same layer, a binder resin B2 contained in the optical functional layer according to the present invention is used as a resin constituting the transparent substrate, and the primary particles $VO_S$ of vanadium dioxide of vanadium-dioxide-containing fine particles and the secondary particles $VO_M$ of the vanadium-dioxide-containing fine particles are dispersed in the binder resin B2 to form an optical functional layer that is a single layer and also serves as a transparent substrate.

Figure 3A:
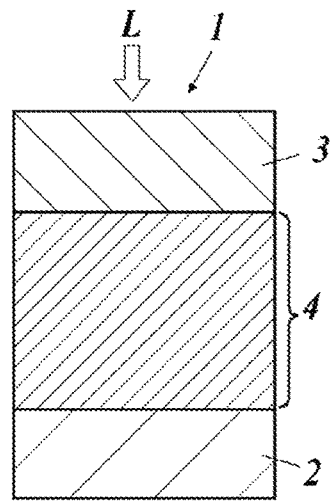
FIG. 3A is a schematic cross-sectional view illustrating an example of layer arrangement of the optical film including a near-infrared light shielding layer of the present invention.
Figure 3B:
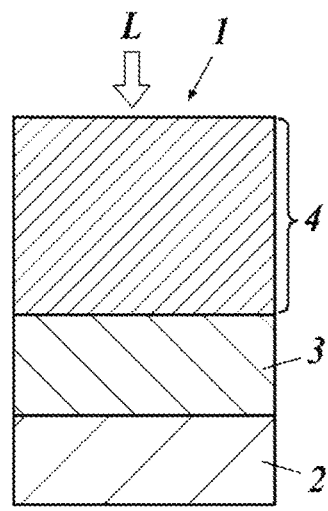
FIG. 3B is a schematic cross-sectional view illustrating another example of layer arrangement of the optical film including a near-infrared light shielding layer of the present invention.
Figure 3C:
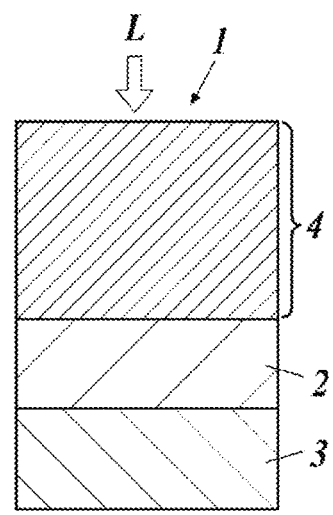
FIG. 3C is a schematic cross-sectional view illustrating still another example of layer arrangement of the optical film including a near-infrared light shielding layer of the present invention.

FIG. 3A to FIG. 3C are schematic cross-sectional views illustrating typical layer arrangement of an optical film having the optical functional layer 3 that is the first embodiment according to the present invention and a near-infrared light shielding layer on a transparent substrate in the configuration illustrated in FIG. 1.

The optical film 1 illustrated in FIG. 3A has a configuration in which the optical functional layer 3, a near-infrared light shielding layer 4, and the transparent substrate 2 are sequentially arranged from a light beam incident side L.

The optical film 1 illustrated in FIG. 3B is an example in which the optical functional layer 3 according to the present invention is arranged between the transparent substrate 2 and the near-infrared light shielding layer 4, and FIG. 3C is an example in which the near-infrared light shielding layer 4 is arranged at the light beam incident side L of the transparent substrate 2 and the optical functional layer 3 according to the present invention is arranged at the rear surface side of the transparent substrate 2.

For the optical film of the present invention, in addition to each constituent layer described above, as necessary, various functional layers may be provided.

The total film thickness of the optical film of the present invention is not particularly limited, but is in a range of 250 to 1,500 μm, preferably in a range of 400 to 1,200 μm, further preferably in a range of 600 to 1,000 μm, and particularly preferably in a range of 750 to 900 μm.

For the optical characteristics of the optical film of the present invention, a visible light transmittance measured by a method according to JIS R3106 (1998) is preferably 60% or more, more preferably 70% or more, and further preferably 80% or more. In addition, the optical film preferably has a region having a reflectance of more than 50% in 900 to 1400 nm wavelength region.

<<Each Constituent Material of Optical Film>>

The optical functional layer of the optical film of the present invention has a sea-island structure including a sea region formed by the binder resin and island regions formed by the vanadium-dioxide-containing fine particles, a number average particle diameter of total particles including primary particles and secondary particles of the vanadium-dioxide-containing fine particles is 200 nm or less, an average value of a closest wall-to-wall distance between the island regions is in a range of 1 to 1,000 nm, and the number of the island regions having the closest wall-to-wall distance of 1,100 nm or more is 10% by number or less with respect to the total number of the island regions.

Hereinafter, the optical functional layer that is a constituent element of the optical film of the present invention, and a resin substrate and a near-infrared light shielding layer that are provided as necessary will be described in detail.

[Optical Functional Layer]

The optical functional layer according to the present invention contains at least vanadium-dioxide-containing fine particles and a binder resin. Further, the optical functional layer according to the present invention has a sea-island structure including a sea region formed by the binder resin and island regions formed by the vanadium-dioxide-containing fine particles, an average value of a closest wall-to-wall distance between the island regions is in a range of 1 to 1,000 nm, and the number of the island regions having the closest wall-to-wall distance of 1,100 nm or more is 10% by number or less with respect to the total number of the island regions.

Incidentally, in the optical functional layer, it is preferable that the vanadium-dioxide-containing fine particles are vanadium-dioxide-containing fine particles prepared by an aqueous synthesis method described later, and the binder resin is an aqueous binder resin or hydrophobic binder resin described later.

In the present invention, as described above, the island regions formed by the vanadium-dioxide-containing fine particles are regions formed from the primary particles $VO_S$ and the secondary particles $VO_M$ of vanadium dioxide.

(Closest Wall-to-Wall Distance)

The closest wall-to-wall distance between the island regions according to the present invention will be described in detail.

The vanadium-dioxide-containing fine particles have an average value of the closest wall-to-wall distance between the island regions of 1 to 1,000 nm, and the matter that the number of the island regions having the closest wall-to-wall distance of 1,100 nm or more is 10% by number or less with respect to the total number of the island regions in the optical functional layer means that the island regions in the optical functional layer exist at a specific pitch. In other words, conversely, there is no case where regions in which the island regions are overly densely present in the optical functional layer and regions in which the island regions are almost not present are mixed such that the effect of the present invention cannot be exhibited, but the vanadium-dioxide-containing fine particles are dispersed in the optical functional layer with uniform minute gaps and no unevenness.

Further, in the present invention, when the average value of the closest wall-to-wall distance in the optical functional layer is 1 to 1,000 nm and the number of the island regions having the closest wall-to-wall distance of 1,100 nm or more is 10% by number or less with respect to the total number of the island regions in the optical functional layer, the binder resin and the particles are uniformly dispersed in the optical functional layer so that an electromagnetic wave treatment (plasmon reflection, plasmon absorption) by the vanadium-dioxide-containing fine particles at high temperature is optimized. Thus, the electromagnetic wave energy can be efficiently dispersed and the electromagnetic wave passing through the optical film can be minimized. As a result, the deterioration of the binder resin is suppressed, and thus haze and adhesiveness are enhanced.

Further, when the number of the island regions having the closest wall-to-wall distance of 1,100 nm or more is more than 10% by number with respect to the total number of the island regions in the optical functional layer, the deterioration of the binder resin increases, and thus performances such as haze and adhesiveness are deteriorated.

In addition, in the optical functional layer used in the present invention, particularly, the number of the island regions having the closest wall-to-wall distance of 1,300 nm or more is preferably 0% by number with respect to the total number of the island regions. The state in which the number of the island regions having the closest wall-to-wall distance of 1,300 nm or more is 0% by number means that the island regions are dispersed in the optical functional layer at proper distance gaps and the island regions are finely dispersed while there is not unevenness in distribution of the island regions in the optical functional layer at all.

(Measurement of Average Value of Closest Wall-to-Wall Distance Between Island Regions)

For the closest wall-to-wall distance between the island regions, when an arbitrary direction on the surface of the optical film including the optical functional layer is regarded as 0°, the optical film is cut in a film thickness direction perpendicular to the optical film surfaces in directions of 0° and 90°, each cross-section is captured by a scanning electron microscope (S-4300, manufactured by Hitachi High-Technologies Corporation), total 40 island regions of each 20 island regions from the cross-section in the 0° direction and the cross-section in the 90° direction are randomly selected from the photograph by using image analysis software "Azo-kun (registered trademark)" (manufactured by Asahi Kasei Corporation) according to a distance-between-centroids method, centroids of two most closest island regions among respective island regions are connected by a straight line, a distance between outer edges (walls or interfaces) facing each other is obtained as the closest wall-to-wall distance between the island regions, and the average value of the total 40 island regions is regarded as the average value of the closest wall-to-wall distance between the island regions.

[Vanadium-Dioxide-Containing Fine Particles]

The crystalline form of the vanadium-dioxide-containing fine particles according to the present invention is not particularly limited, but from the viewpoint of effectively exhibiting thermochromic properties (automatic light-modulating properties), rutile-type vanadium-dioxide-containing fine particles ($VO_2$-containing fine particles) are particularly preferably used.

The rutile-type $VO_2$-containing fine particles have a monoclinic structure at a temperature equal to or lower than transition temperature, and thus is also called an M type. In the vanadium-dioxide-containing fine particles according to the present invention, in a range that does not impair the object, $VO_2$-containing fine particles of other crystalline forms such as an A type or a B type may be included.

The vanadium-dioxide-containing fine particles according to the present invention exist in the optical functional layer while dispersed at a number average particle diameter of total particles including primary particles and secondary particles of 200 nm or less.

The number average particle diameter (nm) of total particles including primary particles and secondary particles of the vanadium-dioxide-containing fine particles in the optical functional layer can be obtained according to the aforementioned method.

The number average particle diameter of total particles including primary particles and secondary particles in the vanadium-dioxide-containing fine particles according to the present invention is preferably 200 nm or less, further preferably in a range of 1 to 180 nm, more preferably in a range of 5 to 100 nm, and most preferably in a range of 10 to 80 nm.

Further, the primary particle diameter of the vanadium-dioxide-containing fine particles is preferably in a range of 1 to 150 nm, more preferably in a range of 5 to 100 nm, and most preferably in a range of 10 to 50 nm.

In the optical film of the present invention, the ratio of the number of primary particles of the vanadium-dioxide-containing fine particles in the optical functional layer which can be obtained by the above-described measurement method is preferably 25% by number or more of the total number of total particles including primary particles and secondary particles, further preferably 50% by number or more, and particularly preferably 70% by number or more. The ideal upper limit is 100% by number, but the maximum value in the actual state is 95% by number or less.

Further, the aspect ratio of the vanadium-dioxide-containing fine particles is preferably in a range of 1.0 to 3.0.

In the vanadium-dioxide-containing fine particles having such characteristics, the aspect ratio is sufficiently small and the shape is isotropic, and thus dispersibility when the vanadium-dioxide-containing fine particles is added to a solution is favorable. In addition, since the particle diameter in a single crystalline state is sufficiently small, favorable thermochromic properties can be exhibited as compared to fine particles of the related art.

In the vanadium-dioxide-containing fine particles according to the present invention, in addition to vanadium dioxide ($VO_2$), for example, at least one element selected from the group consisting of tungsten (W), molybdenum (Mo), niobium (Nb), tantalum (Ta), tin (Sn), rhenium (Re), iridium (Ir), osmium (Os), ruthenium (Ru), germanium (Ge), chromium (Cr), iron (Fe), gallium (Ga), aluminum (Al), fluorine (F), and phosphorus (P) may be contained. With the addition of such an element, it is possible to control a phase transition property (particularly, light-modulating temperature) of the vanadium-dioxide-containing fine particles. Incidentally, the total amount of such an additive (dopant) with respect to the vanadium-dioxide-containing fine particles to be finally obtained is sufficiently about 0.1 to 5.0 atom % with respect to vanadium (V) atoms.

Further, the concentration of the vanadium-dioxide-containing fine particles in the optical functional layer according to the present invention is not particularly limited, but roughly, is preferably in a range of 5 to 60% by mass with respect to the total mass of the optical functional layer, more preferably in a range of 5 to 40% by mass, and further preferably in a range of 5 to 30% by mass.

(1: Method for Producing Vanadium-Dioxide-Containing Fine Particles)

Generally, examples of the method for producing vanadium-dioxide-containing fine particles include a method of crushing a $VO_2$ sintered body synthesized by a solid-phase method and an aqueous synthesis method in which divanadium pentaoxide ($V_2O_5$) is used as a raw material and particles are grown while $VO_2$ is synthesized in a liquid phase.

As the method for producing vanadium-dioxide-containing fine particles according to the present invention, from the viewpoint that the average primary particle diameter is small and a variation in particle diameter can be suppressed, an aqueous synthesis method in which $V_2O_5$ is used as a raw material and particles are grown while $VO_2$-containing fine particles are synthesized in a liquid phase is preferable.

Further, examples of the aqueous synthesis method include a hydrothermal synthesis method and an aqueous synthesis method using a super critical state. The details of the hydrothermal synthesis method will be described below. In addition, regarding the details of the aqueous synthesis method using a super critical state (also referred to as a super critical hydrothermal synthesis method), reference can be made to, for example, production methods described in Paragraphs (0011) and (0015) to (0018) of JP 2010-58984 A.

Among the aqueous synthesis methods, in the present invention, a hydrothermal synthesis method is applied, vanadium-dioxide-containing fine particles are prepared as an aqueous dispersion liquid containing vanadium-dioxide-containing fine particles by an aqueous synthesis method, a coating liquid for forming an optical functional layer is prepared without vanadium-dioxide-containing fine particles in the aqueous dispersion liquid being dried, and an optical functional layer is formed by using the coating liquid for forming an optical functional layer in this state so that it is possible to form the optical functional layer according to the present invention containing the vanadium-dioxide-containing fine particles having the number average particle diameter according to the present invention that the number average particle diameter of total particles including primary particles and secondary particles is 200 nm or less. In addition, as the method for producing vanadium-dioxide-containing fine particles, the vanadium-dioxide-containing fine particles can also be produced by adding, as necessary, fine particles such as minute $TiO_2$ serving as a nucleus of particle growth and allowing a vanadium dioxide phase to be grown on the nucleus particles.

Incidentally, when an aqueous binder resin is used as the binder resin, it is preferable that the vanadium-dioxide-containing fine particles are prepared as the aqueous dispersion liquid containing vanadium-dioxide-containing fine particles described above and then mixed with an aqueous binder resin solution in a dispersing state in which the vanadium-dioxide-containing fine particles are separated without the vanadium-dioxide-containing fine particles in the aqueous dispersion liquid being dried, thereby preparing a coating liquid for forming an optical functional layer.

In addition, when a hydrophobic binder resin is used as the binder resin, it is preferable that the vanadium-dioxide-containing fine particles are prepared as the aqueous dispersion liquid containing vanadium-dioxide-containing fine particles described above, solvent replacement is then performed such that the vanadium-dioxide-containing fine particles are not dried, and the aqueous dispersion liquid is mixed with a hydrophobic binder resin solution in a dispersing state in which the vanadium-dioxide-containing fine particles are separated, thereby preparing a coating liquid for forming an optical functional layer.

Next, the details of the method for producing vanadium-dioxide-containing fine particles by a hydrothermal synthesis method suitable for the present invention will be further described.

Hereinafter, the method for producing vanadium-dioxide-containing fine particles by a typical hydrothermal synthesis method will be described.

(Step 1)

A raw material solution (A) is prepared by mixing a substance (I) containing vanadium (V), hydrazine ($N_2H_4$) or a hydrate thereof ($N_2H_4 \cdot nH_2O$), and water. This raw material solution (A) may be an aqueous solution in which the substance (I) containing vanadium (V) is dissolved in water, or a suspension in which the substance (I) containing vanadium (V) is dispersed in water.

Examples of the substance (I) containing vanadium (V) include divanadium pentaoxide ($V_2O_5$), ammonium vanadate ($NH_4VO_3$), vanadium trichloride oxide ($VOCl_3$), and sodium metavanadate ($NaVO_3$). Incidentally, the substance (I) is not particularly limited as long as it is a compound containing pentavalent vanadium (V). Hydrazine ($N_2H_4$) and a hydrate thereof ($N_2H_4 \cdot nH_2O$) function as a reducing agent of the substance (I) containing vanadium (V) and has a property that the substance is easily dissolved in water.

The raw material solution (A) may further contain a substance (II) containing an element to be added in order to add other elements to single-crystal fine particles of vanadium dioxide ($VO_2$) to be finally obtained. Examples of the element to be added include tungsten (W), molybdenum (Mo), niobium (Nb), tantalum (Ta), tin (Sn), rhenium (Re), iridium (Ir), osmium (Os), ruthenium (Ru), germanium (Ge), chromium (Cr), iron (Fe), gallium (Ga), aluminum (Al), fluorine (F), and phosphorus (P).

The thermochromic properties of the vanadium-dioxide-containing fine particles, particularly, the transition temperature can be controlled by adding these elements to vanadium dioxide ($VO_2$)-containing single-crystal fine particles to be finally obtained.

Further, this raw material solution (A) may further contain a substance (III) having an oxidizing property or a reducing property. Examples of the substance (III) include hydrogen peroxide ($H_2O_2$). When the substance (III) having an oxidizing property or a reducing property is added, the pH of the solution can be adjusted or the substance containing vanadium (V) that is the substance (I) can be uniformly dissolved.

(Step 2)

Next, a hydrothermal reaction treatment is performed using the prepared raw material solution (A). Herein, the term "hydrothermal reaction" means chemical reaction occurring in hot water (subcritical water) with temperature and pressure lower than the critical points (374° C., 22 MPa) of water. The hydrothermal reaction treatment is performed, for example, in an autoclave device. Single-crystal fine particles containing vanadium dioxide ($VO_2$) can be obtained by the hydrothermal reaction treatment.

The conditions of the hydrothermal reaction treatment (such as an amount of reaction product, treatment temperature, treatment pressure, and treatment time) are appropriately set, but the temperature of the hydrothermal reaction treatment is, for example, in a range of 250 to 350° C., preferably in a range of 250 to 300° C., and more preferably in a range of 250 to 280° C. When the temperature is lowered, the particle diameter of the single-crystal fine particles to be obtained can be decreased. However, when the particle diameter is extremely small, crystallinity is decreased. In addition, the time for the hydrothermal reaction treatment is, for example, preferably in a range of 1 hour to 5 days. When the time is lengthened, the particle diameter or the like of the single-crystal fine particles to be obtained can be controlled. However, when the treatment time is extremely long, energy consumption amount is large and productivity is also decreased.

(Step 3)

A coating treatment with a resin or a surface modification treatment may be performed on surfaces of the obtained vanadium-dioxide-containing fine particles as necessary. With these treatments, single-crystal fine particles in which the surfaces of the vanadium-dioxide-containing fine particles are protected and which are surface modified can be obtained. In the present invention, of them, an aspect in which the surfaces of the vanadium-dioxide-containing fine particles are coated with the same resin as the aqueous binder resin or a resin similar to the aqueous binder resin is preferable. Incidentally, the term "coating" described in the present invention may indicate a state in which the whole surfaces of the vanadium-dioxide-containing fine particles are completely coated with the resin or a state in which a part of the surfaces of the particles is coated with the resin. A state in which 50% or more of the entire area of the particle surface are coated is preferable.

A dispersion liquid containing vanadium dioxide ($VO_2$)-containing single-crystal fine particles having thermochromic properties is obtained through the above Step 1 to Step 3.

<Removal Treatment of Impurities of Vanadium-Dioxide-Containing Fine Particle Dispersion Liquid>

Impurities such as residues generated in the synthesis process are contained in the dispersion liquid of the vanadium-dioxide-containing fine particles prepared by the aqueous synthesis method. Such impurities become a trigger to generate secondary aggregated particles when an optical functional layer is formed and may cause the deterioration of the optical functional layer in long-term storage. Thus, the impurities are preferably removed at the stage of the dispersion liquid in advance.

A conventionally known technique of separating foreign substances or impurities can be employed as a method of removing impurities in the vanadium-dioxide-containing fine particle dispersion liquid, and for example, a method of performing centrifugal separation on the vanadium-dioxide-containing fine particle dispersion liquid to precipitate the vanadium-dioxide-containing fine particles, then removing impurities in the supernatant, and adding a dispersing medium again to disperse the vanadium-dioxide-containing fine particles, a method of removing impurities to the outside of the system by using an exchange membrane such as an ultrafiltration membrane, or the like can be mentioned. From the viewpoint of preventing the vanadium-dioxide-containing fine particles from being aggregated, a method using an ultrafiltration membrane is most preferable.

Examples of materials constituting the ultrafiltration membrane may include cellulose-based materials, polyether sulfone-based materials, and polytetrafluoroethylene (abbreviation: PTFE), and among them, polyether sulfone-based materials and PTFE are preferably used.

(2: Preparation Method of Solvent Dispersion Liquid Containing Vanadium-Dioxide-Containing Fine Particles: Solvent Replacement Treatment)

In the present invention, it is preferable that an aqueous dispersion liquid containing vanadium-dioxide-containing fine particles is prepared by the above-described aqueous synthesis method, and then a solvent dispersion liquid containing vanadium-dioxide-containing fine particles is prepared as the aqueous dispersion liquid by a solvent replacement step without the vanadium-dioxide-containing fine particles going through a drying process.

The solvent replacement step is configured by a concentrating step of concentrating a dispersion liquid containing vanadium-dioxide-containing fine particles and a solvent dilution step of performing dilution by adding a solvent to a concentrated liquid, and the solvent replacement step is preferably a step of preparing a non-aqueous solvent dispersion liquid containing vanadium-dioxide-containing fine particles by repeating treatment operations configured by the concentrating step and the solvent dilution step subsequent to the concentrating step two or more times.

A specific concentrating means to be used in the concentrating step of the dispersion liquid containing vanadium-dioxide-containing fine particles is preferably an ultrafiltration method.

Hereinafter, the specific method of the solvent replacement treatment will be described.

A solvent which is applicable to the solvent replacement treatment according to the present invention is an organic solvent, and is preferably a non-aqueous organic solvent. Eventually, the solvent replacement treatment is a step of preparing a solvent dispersion liquid containing vanadium-dioxide-containing fine particles by replacing water serving as a medium constituting an aqueous dispersion liquid containing vanadium oxide-containing fine particles with an organic solvent. When the aqueous dispersion liquid is prepared as the solvent dispersion liquid, compatibility with the hydrophobic binder resin forming the optical functional layer is improved and the optical functional layer with high uniformity can be formed.

The solvent can be appropriately selected without particular limitation, and ketone-based solvents such as acetone, dimethyl ketone, and methyl ethyl ketone, alcohol-based solvents such as methanol, ethanol, and isopropyl alcohol, chlorine-based solvents such as chloroform and methylene chloride, aromatic solvents such as benzene and toluene, ester-based solvents such as methyl acetate, ethyl acetate, and butyl acetate, glycol ether-based solvents such as ethylene glycol monomethyl ether and ethylene glycol dimethyl ether, dioxane, hexane, octane, diethyl ether, dimethyl formamide, and the like can be used as long as they can dissolve a hydrophobic binder resin that is simultaneously employed.

The specific solvent replacement treatment will be described with reference to the drawings.

Figure 4:
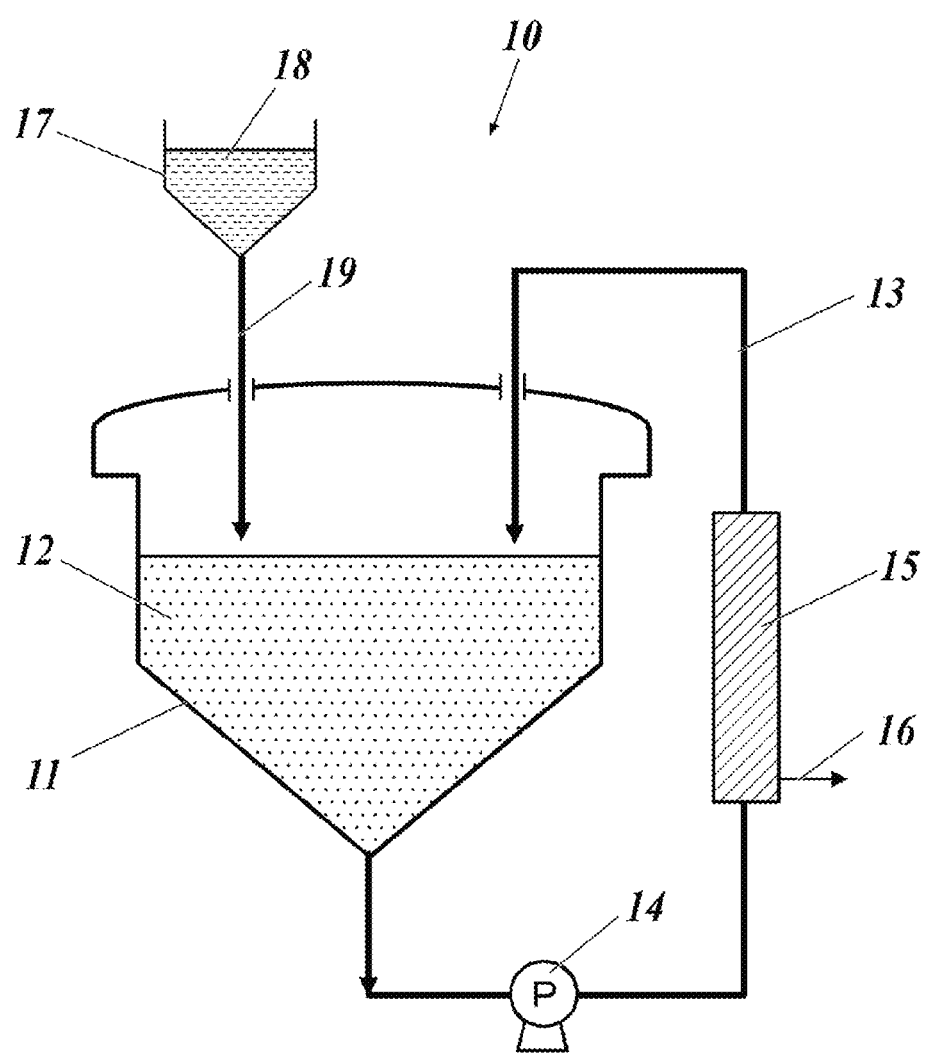
FIG. 4 is a schematic process chart illustrating an example of a solvent replacement treatment device which is applicable to the present invention.

FIG. 4 is schematic configuration diagram illustrating an example of a solvent replacement treatment device which is applicable to the present invention.

A solvent replacement treatment device 10 illustrated in FIG. 4 includes a preparation container 11 for storing a dispersion liquid 12 containing vanadium-dioxide-containing fine particles prepared above, a solvent stock container 17 that stores a solvent 18 for dilution, a solvent supply line 19 that adds the solvent 18 to the preparation container 11, a circulation line 13 that circulates the dispersion liquid 12 in the preparation container 11 by a circulation pump 14, and an ultrafiltration unit 15 that is disposed as a concentrating means in the path of the circulation line 13.

Step (A):

The dispersion liquid containing vanadium-dioxide-containing fine particles prepared by the above-described method is stored as the dispersion liquid 12 in the preparation container 11, and while the dispersion liquid 12 is circulated by the circulation pump 14, the water content in the dispersion liquid is discharged by the ultrafiltration unit 15 from the discharge port 16 to concentrate the dispersion liquid up to a predetermined concentration. As a standard of the concentration, concentrating is carried out up to 20% by volume with respect to the initial volume. If concentrating is excessively carried out up to more than 20% by volume, since particle aggregation according to an increase in particle density may occur, it is preferable to prevent concentrating from being excessively carried. In addition, in this concentrating operation, it is important to keep the dispersion liquid not to be dried.

Step (B):

Next, an amount equivalent to 80% by mass of the solvent 18 is added to the dispersion liquid 12 concentrated up to 20% by volume through the solvent supply line 19 from the solvent stock container 17, and the resultant mixture is sufficiently stirred and mixed to prepare a first solvent-replaced dispersion liquid 12.

Step (C):

Next, similarly to the above Step (A), while the dispersion liquid is circulated by a circulation pump P, the medium (water+solvent) in the dispersion liquid is discharged to the outside of the system by the ultrafiltration unit 15 from a discharge port 16 and then the dispersion liquid is concentrated up to a concentration of 20% by volume again.

Step (D):

Next, similarly to the above Step (B), an amount equivalent to 80% by mass of the solvent 18 is added to the concentrated dispersion liquid through the solvent supply line 19 from the solvent stock container 17, and the resultant mixture is sufficiently stirred and mixed to prepare a second solvent-replaced dispersion liquid 12.

Step (E):

Finally, concentrating and solvent diluting operations by Step (A) and Step (B) are repeated at least two or more times to prepare a solvent dispersion liquid containing vanadium-dioxide-containing fine particles in which the water content is adjusted in a range of 0.1 to 5.0% by mass. Incidentally, the water content can be measured and obtained, for example, by a Karl Fischer's method or the like.

That is, the solvent dispersion liquid containing vanadium-dioxide-containing fine particles according to the present invention can contain water to some extent, and the water content is preferably 30% by mass or less. The water content is further preferably 10% by mass or less and particularly preferably 5.0% by mass or less. In addition, the lower limit is preferably 0.01% by mass or more, further preferably 0.05% by mass or more, and particularly preferably 0.1% by mass or more. Therefore, an aspect in which the solvent dispersion liquid containing vanadium-dioxide-containing fine particles which is prepared by the solvent replacement step contains water in a range of 0.1 to 5.0% by mass is particularly preferable. When the water content in the solvent dispersion liquid is 30% by mass or less, film formability of a coexisting hydrophobic binder is not hindered in formation of the optical functional layer, and a low haze can be achieved. When the water content is 0.01% by mass or more, a variation width of the infrared transmitting ratio and the infrared shielding ratio at the time of temperature change can be increased to some extent. Particularly, when the water content ratio is 5.0% by mass or less, oxidation of vanadium-dioxide-containing fine particles can be prevented, influence on the film formability of the coexisting hydrophobic binder can be further suppressed, and the haze can be also maintained to a lower level. In addition, by adjusting the water content ratio to 0.1% by mass or more, a variation width of the infrared transmitting ratio and the infrared shielding ratio at the time of temperature change can be further increased, which is a preferable condition.

As the ultrafiltration method using a ultrafiltration membrane which is applicable to the solvent replacement treatment, reference can be made to, for example, methods described in Research Disclosure No. 10208 (1972), No. 13122 (1975), and No. 16351 (1977). The pressure difference and the flow rate that are important as operation conditions can be set with reference to the characteristic curve described in "Handbook of Membrane Utilization Technology" written by Haruhiko Oya, published by SAIWAI SHOBO (1978), p. 275.

As the ultrafiltration membrane, organic membranes of flat plate type, spiral type, cylindrical type, hollow fiber type, hollow fiber type, and the like that are already incorporated as modules are commercially available from. Asahi Kasei Corporation, Daicel Corporation, TORAY INDUSTRIES, INC., Nitto Denko Corporation, and the like, but as a membrane having solvent resistance, ceramic membranes manufactured by NGK INSULATORS, LTD., NORITAKE CO., LIMITED, and the like are preferable.

Specifically, for example, a method in which ultrafiltration is performed at a flow velocity of 300 ml/min, a liquid pressure of 100 kPa, and room temperature by using Vivaflow 50 manufactured by Sartorius stedim (effective filtration area: 50 $cm^2$, molecular weight cutoff: 5,000) as a filtration membrane, a method in which ultrafiltration is performed by using a ultrafiltration device (Pellicon-2 cassette manufactured by Millipore Japan Corporation) having a filtration membrane made of polyether sulfone with a molecular weight cutoff of 300,000, and the like can be mentioned.

(Binder Resin)

The binder resin contained in the optical functional layer according to the present invention is not limited to any of a natural resin, a semisynthetic resin, and a synthetic resin as long as it can be formed in a film shape, and may be a thermoplastic resin or a thermosetting resin. Examples thereof include a polyolefin resin, a vinyl chloride resin, an ABS resin, a nylon resin, polyester, polyvinylidene chloride, polyamide, polystyrene, polyacetal, polycarbonate, an acrylic resin, a fluorine resin, a melamine resin, a urea resin, an unsaturated polyester resin, an epoxy resin, a urethane resin, and a phenolic resin. Among them, a hydrophobic binder resin or an aqueous binder resin described below can be preferably used.

(Hydrophobic Binder Resin)

The hydrophobic binder resin described herein is a resin having a dissolution amount at a liquid temperature of 25° C. of less than 1.0 g with respect to 100 g of water, is more preferably a resin having a dissolution amount of less than 0.5 g, and further preferably a resin having a dissolution amount of less than 0.25 g.

As a hydrophobic binder resin to be applied to the optical film or the production method therefor of the present invention, hydrophobic polymers or resins obtained by polymerization in a curing treatment step by using monomers of hydrophobic binder resins are preferably used.

Examples of the hydrophobic polymers which are applicable to the present invention include olefin-based polymers such as polyethylene, polypropylene, ethylene-propylene copolymers, and poly(4-methyl-1-pentene); halogen-containing polymers such as vinyl chloride and chlorinated vinyl resins; styrene-based polymers such as polystyrene, styrene-methyl methacrylate copolymers, styrene-acrylonitrile copolymers, and acrylonitrile-butadiene-styrene block copolymers; polyesters such as polyethylene terephthalate, polybutylene terephthalate, and polyethylene naphthalate; polyamides such as nylon 6, nylon 66, and nylon 610; polyacetal; polycarbonate; polyphenylene oxide; polyphenylene sulfide; polyether ether ketone; polysulfone; polyether sulfone; polyoxybenzylene; polyamideimide; and polyvinyl butyral resins such as an ABS resin (acrylonitrile-butadiene-styrene resin) or ASA resin (acrylonitrile-styrene-acrylate resin) obtained by blending polybutadiene-based rubber with acrylic rubber.

In addition, examples of other hydrophobic binder resins which are applicable to the present invention may include resins obtained by polymerization in a curing treatment step by using monomers of hydrophobic binder resins.

As typical hydrophobic binder resin materials, compounds which are cured by irradiation with active energy rays such as ultraviolet rays and electron beams, and specific examples thereof may include radically polymerizable compounds which are cured by polymerization reaction of active radical species and cationically polymerizable compounds which are cured by cationic polymerization reaction of active cationic species.

Examples of the radically polymerizable compounds include compounds having a radically polymerizable ethylenically unsaturated bond. Specific examples of the compounds having a radically polymerizable ethylenically unsaturated bond include unsaturated carboxylic acid such as acrylic acid, methacrylic acid, itaconic acid, crotonic acid, isocrotonic acid, or maleic acid, and salts thereof, esters, urethanes, amides and anhydrides, acrylonitrile, styrene, and further various kinds of radically polymerizable compounds such as unsaturated polyester, unsaturated polyether, unsaturated polyamide, and unsaturated urethane. Specific examples thereof include acrylic acid derivatives such as urethane acrylate, 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl) propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide, and epoxy acrylate; methacrylic derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate, and 2,2-bis(4-methacryloxypolyethoxyphenyl) propane; and allyl compound derivatives such as allyl glycidyl ether, diallyl phthalate, and triallyl trimellitate.

As the cationically polymerizable compound, various known cationically polymerizable monomers can be used. Examples thereof include epoxy compounds, vinyl ether compounds, and oxetane compounds exemplified in JP 6-9714 A, JP 2001-31892 A, JP 2001-40068 A, JP 2001-55507 A, JP 2001-310938 A, JP 2001-310937 A, and JP 2001-220526 A.

A photopolymerization initiator is preferably contained together with the above-described compounds. As the photopolymerization initiator, any known photopolymerization initiators, as described in "Application and Market of UV•EB Curing Technologies" (CMC Publishing CO., LTD., supervised by Yoneho Tabata and edited by Radotech Study Group), and the like, can be used.

In the present invention, a coating liquid for forming an optical functional layer containing each constituent material and a solvent dispersion liquid containing vanadium-dioxide-containing fine particles is applied, for example, onto a transparent substrate, and then irradiation with active energy rays such as ultraviolet rays or electron beams is performed thereon. Compositions constituting the formed optical functional layer thin film are rapidly cured by the irradiation.

When irradiation with ultraviolet rays as a light source of the active energy rays is performed, for example, UV LEDs, UV lasers, mercury arc lamps, Xenon arc lamps, low-pressure mercury lamps, fluorescent lamps, carbon arc lamps, tungsten-halogen lamps, and sunlight can be used. When curing is performed by electron beams, curing is generally performed by electron beams with an energy of 300 eV or less, but curing can also be instantaneously performed at an irradiation amount of 1 to 5 Mrad.

Meanwhile, as another forming method of the optical functional layer according to the present invention, as the configuration illustrated in FIG. 2, a method can be suitably used in which a solvent and a solvent dispersion liquid containing vanadium-dioxide-containing fine particles are added and dissolved in a hydrophobic resin that is a constituent material of the transparent substrate to prepare a dope for forming a film, and then a hybrid optical functional layer that is a second embodiment and also serves as a transparent substrate is formed using the dope by a solution casting method that is used in film formation of the related art.

As the hydrophobic binder resin which is applicable to the above-described method, resin materials that are conventionally used for forming an optical film can be mentioned, and examples thereof may include polyesters such as polyethylene terephthalate (abbreviation: PET) and polyethylene naphthalate (abbreviation: PEN), polyethylene, polypropylene, cellulose esters such as diacetylcellulose (abbreviation: DAC), triacetyl cellulose (abbreviation: TAC), cellulose acetate butyrate, cellulose acetate propionate (abbreviation: CAP), cellulose acetate phthalate, and cellulose nitrate, and derivatives thereof, polyvinylidene chloride, polyethylene vinyl alcohol, syndiotactic polystyrene, polycarbonate (abbreviation: PC), norbornene resins, polymethylpentene, polyether ketone, polyimide, polyether sulfone (abbreviation: PES), polyphenylene sulfide, polysulfones, polyetherimide, polyether ketone imide, polyamide, fluorine resins, nylon, polymethyl methacrylate, acryl and polyacrylates, and cycloolefin-based resins such as ARTON (trade name, manufactured by JSR Corporation) and APEL (trade name, manufactured by Mitsui Chemicals, Inc.).

In addition, the solvent is not particularly limited, but examples thereof may include methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, and nitroethane.

A hybrid optical functional layer also serving as a transparent substrate as illustrated in FIG. 2 is formed using a dope prepared by mixing respective constituent materials described above by a solution casting method.

(Aqueous Binder Resin)

The aqueous binder resin described herein is a resin that is dissolved at an amount of 1.0 g or more with respect to 100 g of water at 25° C. In addition, a resin that is dissolved in hot water and then is dissolved similarly at 25° C. is also defined as the aqueous binder resin described in the present invention.

Examples of the aqueous binder resin which is useful for formation of the optical functional layer according to the present invention include gelatins, graft polymers of gelatin and other polymeric molecules, proteins such as albumin and casein, celluloses, sodium alginate, cellulose sulfate ester, sugar derivatives such as dextrin, dextran, and dextran sulfate, naturally derived materials such as polysaccharide thickeners, polyvinyl alcohols, polyvinylpyrrolidones, polyacrylic acid, acrylic resins such as acrylic acid-acrylonitrile copolymers, potassium acrylate-acrylonitrile copolymers, vinyl acetate-acrylic acid ester copolymers, or acrylic acid-acrylic acid ester copolymers, styrene acrylic acid resins such as styrene-acrylic acid copolymers, styrene-methacrylic acid copolymers, styrene-methacrylic acid-acrylic acid ester copolymers, styrene-α-methyl styrene-acrylic acid copolymers, or styrene-α-methyl styrene-acrylic acid-acrylic acid ester copolymers, styrene-sodium styrene sulfonate copolymers, styrene-2-hydroxyethyl acrylate copolymers, styrene-2-hydroxyethyl acrylate-potassium styrene sulfonate copolymers, styrene-maleic acid copolymers, styrene-anhydride maleic acid copolymers, vinylnaphthalene-acrylic acid copolymers, vinylnaphthalene-maleic acid copolymers, and vinyl acetate-based copolymers such as vinyl acetate-maleic acid ester copolymers, vinyl acetate-crotonic acid copolymers, and vinyl acetate-acrylic acid copolymers, and salts thereof.

Among them, a polymer containing 50 mol % or more of repeating unit component having a hydroxy group that has high affinity to the vanadium-dioxide-containing fine particles and high effect of preventing aggregation of particles also at the time of drying of film formation is preferable, and examples of such a polymer may include celluloses, polyvinyl alcohols, and acrylic resins having a hydroxy group (for example, polyhydroxyethyl acrylate). Among them, polyvinyl alcohols and celluloses can be most preferably used.

[Other Additives of Optical Functional Layer]

Various additives which are applicable as long as the effects of the present invention are not impaired can be added to the optical functional layer according to the present invention. Examples of the additives include known various additives such as ultraviolet absorbers described in JP 57-74193 A, JP 57-87988 A, and JP 62-261476 A, discoloration inhibitors described in JP 57-74192 A, JP 57-87989 A, JP 60-72785 A, JP 61-146591 A, JP 1-95091 A, and JP 3-13376 A, various anionic, cationic or nonionic surfactants, fluorescent whitening agents described in JP 59-42993 A, JP 59-52689 A, JP 62-280069 A, JP 61-242871 A, and JP 4-219266 A, pH adjusting agents such as sulfuric acid, phosphoric acid, acetic acid, citric acid, sodium hydroxide, potassium hydroxide, and potassium carbonate, defoaming agents, lubricating agents such as diethylene glycol, antiseptic agents, antimold agents, antistatic agents, matting agents, thermal stabilizers, antioxidants, flame retarders, crystal nucleating agents, inorganic particles, organic particles, viscosity reducing agents, lubricants, infrared light absorbing agents, colorants, and pigments.

[Method of Forming Optical Functional Layer]

The preferred method for producing an optical film according to the present invention is a method for producing an optical film, the method including a step of forming an optical functional layer containing at least vanadium-dioxide-containing fine particles and a binder resin. In the step, the optical functional layer has a sea-island structure including a sea region formed by the binder resin and island regions formed by the vanadium-dioxide-containing fine particles, a number average particle diameter of total particles including primary particles and secondary particles of the vanadium-dioxide-containing fine particles is 200 nm or less, an average value of a closest wall-to-wall distance between the island regions is 1 to 1,000 nm, and the number of the island regions having the closest wall-to-wall distance of 1,100 nm or more is adjusted to 10% by number or less with respect to the total number of the island regions.

The method for producing an optical film may form a near-infrared light shielding layer having a function of shielding at least a part of light in a wavelength range of 700 to 1,000 nm, in addition to the optical functional layer.

Incidentally, in the method for producing an optical film, it is preferable that vanadium-dioxide-containing fine particles prepared by an aqueous synthesis method are used as the vanadium-dioxide-containing fine particles and the binder resin is the aqueous binder resin or the hydrophobic binder resin described above.

As a method of forming the optical functional layer 3 that is the first embodiment in the above-described step, when a hydrophobic binder resin is used as the binder resin, a method in which vanadium-dioxide-containing fine particles are prepared by an aqueous synthesis method, a solvent dispersion liquid containing vanadium-dioxide-containing fine particles is then prepared by a solvent replacement step without going through a drying step, the solvent dispersion liquid is mixed with a hydrophobic binder resin or the like and dissolved to prepare a non-aqueous coating liquid for forming an optical functional layer, and this non-aqueous coating liquid for forming an optical functional layer is applied onto a transparent substrate by a wet coating method and dried, is exemplified as one of preferred methods.

Further, as another example of the method of forming the optical functional layer 3 that is the first embodiment, when an aqueous binder resin is used as the binder resin, a method in which vanadium-dioxide-containing fine particles prepared by an aqueous synthesis method are prepared as vanadium-dioxide-containing fine particles, an aqueous coating liquid for forming an optical functional layer is then prepared by mixing with an aqueous binder resin solution prepared by dissolving the aqueous binder resin in an aqueous solvent in a dispersion liquid state in which vanadium-dioxide-containing fine particles are not gathered but separated, without going through a drying step, and this coating liquid for forming an optical functional layer is applied onto a transparent substrate by a wet coating method and dried to form an optical functional layer, is exemplified as one of preferred methods.

Incidentally, the term "aqueous solvent" refers to a solvent having 50% by mass or more of water. Needless to say, 100% by mass not containing other solvents may be pure water, and in consideration of dispersion stability of the vanadium-dioxide-containing fine particles, the content of other organic solvents is preferably small. As a solvent configuring the aqueous solvent, a component other than water is not particularly limited as long as it is a solvent that is compatibilized in water, but alcohol-based solvents can be preferably used. Among them, isopropyl alcohol having a boiling point relatively close to that of water is preferable.

The wet coating method used for formation of the optical functional layer is not particularly limited, but examples thereof include a roll coating method, a rod bar coating method, an air knife coating method, a spray coating method, a slide-type curtain application method, a slide hopper application method described in U.S. Pat. Nos. 2,761,419, 2,761,791, or the like, and an extrusion coat method.

In addition, as a method of forming a hybrid optical functional layer that is the second embodiment and also serves as a resin substrate in the above-described step, a solution casting method generally known as a film formation method can be employed. As a specific film formation method, for example, solution casting film formation methods described in JP 2013-067074 A, JP 2013-123868 A, JP 2013-202979 A, JP 2014-066958 A, JP 2014-095729 A, JP 2014-159082 A, and the like are mentioned, and the hybrid optical functional layer can be formed according to these solution casting film formation methods.

<<Transparent Substrate>>

The transparent substrate which is applicable to the present invention is not particularly limited as long as it is transparent, and examples thereof may include glass, quartz, and transparent resin films. From the viewpoint of flexibility and production suitability (production process suitability), transparent resin films are preferable. The term "transparent" described in the present invention indicates that an average light transmittance in a visible light range is 50% or more, and is preferably 20% or more, preferably 30% or more, more preferably 50% or more, and particularly preferably 70% or more.

The thickness of the transparent substrate is preferably in a range of 30 to 200 µm, more preferably in a range of 30 to 100 µm, and further preferably in a range of 35 to 70 µm. When the thickness of the transparent substrate is 30 µm or more, wrinkles or the like during handling are less likely to occur. In addition, when the thickness is 200 µm or less, conformability to glass curved surfaces in the attachment to a glass substrate at the time of producing a laminated glass is improved.

The transparent substrate is preferably a biaxially-oriented polyester film, but an unstretched polyester film or a polyester film stretched in at least one direction can also be used. From the viewpoint of improving strength and suppressing thermal expansion, a stretched film is preferable. In particular, when a laminated glass provided with the optical film of the present invention is used as an automotive windshield, a stretched film is more preferable.

From the viewpoint of preventing occurrence of wrinkles of the optical film or cracks of an infrared reflection layer, the thermal shrinkage rate at a temperature of 150° C. of the transparent substrate is preferably in a range of 0.1 to 3.0%, more preferably in a range of 1.5 to 3.0%, and further preferably in a range of 1.9 to 2.7%.

The transparent substrate which is applicable to the optical film of the present invention is not particularly limited as long as it is transparent, but various resin films are preferably used. Examples of transparent resin films that can be used include polyolefin films (for example, polyethylene or polypropylene), polyester films (for example, polyethylene terephthalate or polyethylene naphthalate), polyvinyl chloride, and a triacetyl cellulose film. A polyester film or a triacetyl cellulose film is preferable.

Polyester films (hereinafter, simply referred to as polyesters) are not particularly limited, but polyesters having formability into films containing dicarboxylic acid components and diol components as main components are preferable. Examples of dicarboxylic acid components as main components may include terephthalic acid, isophthalic acid, phthalic acid, 2,6-naphthalene dicarboxylic acid, 2,7-naphthalene dicarboxylic acid, diphenylsulfonedicarboxylic acid, diphenyletherdicarboxylic acid, diphenylethanedicarboxylic acid, cyclohexanedicarboxylic acid, diphenyldicarboxylic acid, diphenylthioetherdicarboxylic acid, diphenylketonedicarboxylic acid, and phenylindandicarboxylic acid. In addition, examples of diol components may include ethylene glycol, propylene glycol, tetramethylene glycol, cyclohexanedimethanol, 2,2-bis(4-hydroxyphenyl)propane, 2,2-bis(4-hydroxyethoxyphenyl)propane, bis(4-hydroxyphenyl)sulfone, bisphenol fluorene dihydroxy ethyl ether, diethylene glycol, neopentyl glycol, hydroquinone, and cyclohexanediol. Among polyesters containing these components as main components, from the viewpoint of transparency, mechanical strength, dimensional stability, and the like, polyesters mainly composed of terephthalic acid or 2,6-naphthalene dicarboxylic acid as a dicarboxylic acid component and ethylene glycol or 1,4-cyclohexanedimethanol as a diol component are preferable. Among these, polyesters mainly composed of polyethylene terephthalate or polyethylene naphthalate, copolyesters formed from terephthalic acid, 2,6-naphthalene dicarboxylic acid, and ethylene glycol, and polyesters mainly composed of mixtures of two or more of these polyesters are preferable.

When a transparent resin film is used as the transparent substrate, the transparent resin film may contain particles in order to improve handleability, provided that they do not impair transparency. Examples of particles used in the present invention may include inorganic particles such as calcium carbonate, calcium phosphate, silica, kaolin, talc, titanium dioxide, alumina, barium sulfate, calcium fluoride, lithium fluoride, zeolite, and molybdenum sulfide, and organic particles such as crosslinked polymer particles and calcium oxalate. In addition, examples of methods of adding particles may include a method of adding particles by incorporating the particles into polyester used as a raw material, and a method of adding particles directly into an extruder. Anyone of these methods may be employed or both of them may be used in combination. In addition to the particles, additives may be added as necessary in the present invention. Examples of such additives include stabilizers, lubricating agents, cross-linking agents, antiblocking agents, antioxidants, dyes, pigments, and ultraviolet absorbers.

The transparent resin film serving as the transparent substrate can be produced by a general method known in the related art. For example, an unstretched transparent resin film that is substantially amorphous and not oriented can be produced by melting a resin serving as a material with an extruder and extruding the resin through a ring die or T-die followed by quenching. In addition, a stretched transparent resin film can be produced by stretching an unstretched transparent resin film in the flow (longitudinal) direction of the transparent resin film, or in the perpendicular (width) direction to the flow direction of the transparent resin film by a known method such as uniaxial stretching, tenter type sequential biaxial stretching, tenter type simultaneous biaxial stretching, or tubular type simultaneous biaxial stretching. The stretching ratio in this case can be appropriately selected according to the resin used as a raw material of the transparent resin film, and is preferably 2 to 10 times in the longitudinal direction and the width direction.

In addition, the transparent resin film may be subjected to a relaxation treatment and an off-line heat treatment from the viewpoint of dimensional stability. The relaxation treatment is preferably performed in a process in a tenter for width stretching or before rolling up outside a tenter after heat setting in the process of stretched film formation for the polyester film. The relaxation treatment is preferably performed at a treatment temperature of 80 to 200° C., and the treatment temperature is more preferably 100 to 180° C. The relaxation treatment is performed at a relaxation rate in both the longitudinal direction and the width direction preferably in a range of 0.1 to 10%, and more preferably in a range of 2 to 6%. The off-line heat treatment of a relaxed substrate improves thermal resistance and further increases dimensional stability.

One surface or both surfaces of the transparent resin film are preferably coated in-line with an undercoat layer coating liquid in the process of film formation. In the present invention, undercoating in the process of film formation refers to in-line undercoating.

<<Near-Infrared Light Shielding Layer>>

In the optical film of the present invention, in addition to the optical functional layer, a near-infrared light shielding layer having a function of shielding at least a part of light in a wavelength range of 700 to 1,000 nm can be provided.

Regarding the details of the near-infrared light shielding layer which is applicable to the present invention, reference can be made to, for example, constituent elements and formation methods described in JP 2012-131130 A, JP 2012-139948 A, JP 2012-185342 A, JP 2013-080178 A, JP 2014-089347 A, and the like.

<<Use Application of Optical Film>>

Regarding the use application of the optical film of the present invention, a laminated glass can be configured by interposing the optical film between a pair of glass constituent members, and this laminated glass can be used for automobiles, railroad vehicles, aircrafts, vessels, buildings, and the like. The laminated glass can also be used for use application other than the above-described use application. The laminated glass is preferably a laminated glass for construction or vehicles. The laminated glass can be used for windshields, side glasses, rear glasses, or roof glasses of automobiles.

Examples of the glass member include inorganic glass and organic glass (resin glazing). Examples of the inorganic glass include colored glass such as float glass plate, heat absorbing glass plate, polished glass plate, molding glass plate, wire glass plate, line glass plate, and green glass. The organic glass is synthetic resin glass substituting for inorganic glass. Examples of the organic glass (resin glazing) include a polycarbonate plate and a poly(meth)acrylic resin plate. Examples of the poly(meth)acrylic resin plate include a polymethyl (meth)acrylate plate. In the present invention, from the viewpoint of safety when breakage occurs due to application of impact from outside, inorganic glass is preferable.

EXAMPLES

Hereinafter, the present invention will be described in detail with reference to Examples, but the present invention is not limited thereto. Incidentally, the expression "part" or "%" in Examples represents "part by mass" or "% by mass" unless otherwise specified.

<<Production of Optical Film>>

[Production of Optical Film 1]

(Preparation of Vanadium-Dioxide-Containing Fine Particle Dispersion Liquid 1: Presence of Particle Drying Step)

0.433 g of ammonium vanadate ($NH_4VO_3$, manufactured by Wako Pure Chemical Industries, Ltd., special grade) was mixed with 10 mL of pure water, 5% by mass aqueous solution of hydrazine hydrate ($N_2H_4 \cdot H_2O$, manufactured by Wako Pure Chemical Industries, Ltd., special grade) was gradually added dropwise thereto to prepare a solution having a pH value (liquid temperature: 23° C.) at 23° C. and 55% RH of 9.2. The prepared solution was placed in a commercially-available hydrothermal reaction autoclave (HU-25 type manufactured by SAN-AI Kagaku Co., Ltd., including a configuration in which a 25 mL-volume inner cylinder made of Teflon (registered trademark) is provided in a main body made of SUS) and a hydrothermal reaction treatment was performed at 100° C. for 8 hours and subsequently performed at 270° C. for 24 hours.

Next, the obtained reaction product was filtered and the filter residue was subjected to filtration and washing with water and ethanol. Further, this reaction product was dried at 60° C. for 10 hours using a constant temperature dryer to obtain a powder of vanadium-dioxide-containing fine particles.

Next, the obtained powder of vanadium-dioxide-containing fine particles was added to pure water to have a concentration of 3.0% by mass, thereby preparing a mixed solution. The mixed solution was dispersed again by performing an ultrasonic dispersion treatment for 5 minutes using an ultrasonic dispersion machine (UH-300 manufactured by SMT Co., Ltd.) to prepare a vanadium-dioxide-containing fine particle dispersion liquid 1.

(Preparation of Coating Liquid 1 for Forming Optical Functional Layer)

An aqueous coating liquid 1 for forming an optical functional layer was prepared by sequentially adding, mixing, and dissolving the following respective constituent materials.

| | |
|---|---|
| 3% by mass vanadium-dioxide-containing fine particle dispersion liquid 1 | 28 parts by mass |
| 3% by mass aqueous solution of boric acid | 10 parts by mass |
| 5% by mass polyvinyl alcohol (5% by mass aqueous solution, PVA-124; degree of polymerization: 2,400, degree of saponification: 98 to 99 mol %; manufactured by Kuraray Co., Ltd.) | 60 parts by mass |
| 5% by mass aqueous solution of surfactant (SOFTAZOLINE LSB-R, manufactured by Kawaken Fine Chemicals Co., Ltd.) | 2 parts by mass |

Incidentally, PVA-124 that is polyvinyl alcohol is a polymer in which a ratio of hydroxy group-containing repeating unit is 50 mol % or more.

Further, the "degree of saponification" described herein refers to the ratio of hydroxy groups to the total number of acetyloxy groups (derived from vinyl acetate as a raw material) and hydroxy groups in polyvinyl alcohol.

(Formation of Optical Functional Layer)

The prepared coating liquid 1 for forming an optical functional layer was wet-applied onto a transparent substrate of a polyethylene terephthalate film (A4300 manufactured by TOYOBO CO., LTD., both-sided easily adhesive layer) having a thickness of 50 µm by using an extrusion coater under the condition that the layer thickness after drying became 1.5 µm. Then, the substrate was dried by blowing a hot air at 110° C. for 2 minutes to form an optical functional layer, thereby producing an optical film 1. Incidentally, the number average particle diameter, the ratio of primary particles, the average value of the closest wall-to-wall distance, and the ratio of the number of the island regions having the closest wall-to-wall distance of 1,100 nm or more of the optical film 1 were obtained by methods described later, and found to have results as presented in Table 1.

(Production of Optical Films 2 to 34)

Optical films 2 to 34 were produced in the same as in the production of the optical film 1, except that the number average particle diameter, the ratio of primary particles, the average value of the closest wall-to-wall distance, and the ratio of the number of the island regions having the closest wall-to-wall distance of 1,100 nm or more were changed as presented in Table 1 by adjusting the reaction temperature and the reaction time in the hydrothermal reaction treatment and adjusting the amount of the vanadium-dioxide-containing fine particles to be contained in the coating liquid 1 for forming an optical functional layer, in the preparation of the vanadium-dioxide-containing fine particle dispersion liquid 1.

[Production of Optical Film 41]

An optical film 41 was produced in the same manner as in the production of the optical film 3, except that the same amount of polyvinylpyrrolidone (PVP, manufactured by NIPPON SHOKUBAI CO., LTD., K-85, K value=85) was used instead of polyvinyl alcohol (PVA-124) serving as the aqueous binder resin used in the preparation of the coating liquid 1 for forming an optical functional layer.

Polyvinylpyrrolidone K-85 is a polymer in which a ratio of hydroxy group-containing repeating unit is less than 50 mol %.

Incidentally, the number average particle diameter, the ratio of primary particles, the average value of the closest wall-to-wall distance, and the ratio of the number of the island regions having the closest wall-to-wall distance of 1,100 nm or more of the optical film 41 were obtained by methods described later, and found to have results as presented in Table 2.

[Production of Optical Film 42]

An optical film 42 was produced in the same manner as in the production of the optical film 3, except that the same amount of polyhydroxyethyl acrylate (abbreviation: PHEA) was used instead of polyvinyl alcohol (PVA-124) serving as the aqueous binder resin used in the preparation of the coating liquid 1 for forming an optical functional layer.

Incidentally, the number average particle diameter, the ratio of primary particles, the average value of the closest wall-to-wall distance, and the ratio of the number of the island regions having the closest wall-to-wall distance of 1,100 nm or more of the optical film 42 were obtained by methods described later, and found to have results as presented in Table 2.

[Production of Optical Film 43]

An optical film 43 was produced in the same manner as in the production of the optical film 3, except that the same amount of polyvinyl alcohol (PVA-217) was used instead of polyvinyl alcohol (PVA-124) serving as the aqueous binder resin used in the preparation of the coating liquid 1 for forming an optical functional layer.

Incidentally, the number average particle diameter, the ratio of primary particles, the average value of the closest wall-to-wall distance, and the ratio of the number of the island regions having the closest wall-to-wall distance of 1,100 nm or more of the optical film 43 were obtained by methods described later, and found to have results as presented in Table 2.

[Production of Optical Film 50]

(Preparation of Vanadium-Dioxide-Containing Fine Particle Dispersion Liquid 2: Absence of Particle Drying Step)

0.433 g of ammonium vanadate ($NH_4VO_3$, manufactured by Wako Pure Chemical Industries, Ltd., special grade) was mixed with 10 mL of pure water, 5% by mass aqueous solution of hydrazine hydrate ($N_2H_4 \cdot H_2O$, manufactured by Wako Pure Chemical Industries, Ltd., special grade) was gradually added dropwise thereto to prepare a solution having a pH value (liquid temperature: 23° C.) of 9.2. The prepared solution was placed in a commercially-available hydrothermal reaction autoclave (HU-25 type manufactured by SAN-AI Kagaku Co., Ltd., including a configuration in which a 25 mL-volume inner cylinder made of Teflon (registered trademark) is provided in a main body made of SUS) and a hydrothermal reaction treatment was performed at 100° C. for 8 hours and subsequently performed at 270° C. for 24 hours to prepare an aqueous vanadium-dioxide-containing fine particle dispersion liquid 2 in which vanadium-dioxide-containing fine particles are dispersed at a concentration of 3.0% by mass.

(Preparation of Solvent-Based Vanadium-Dioxide-Containing Fine Particle Dispersion Liquid 3 by Ultrafiltration Treatment of Vanadium-Dioxide-Containing Fine Particle Dispersion Liquid 2)

The concentrating operation was performed by using the solvent replacement treatment device illustrated in FIG. 4, which is provided with a ultrafiltration device (Pellicon-2 cassette manufactured by Millipore Japan Corporation) having a filtration membrane made of polyether sulfone with a molecular weight cutoff of 300,000 and connected to be circulated in the system, while the prepared vanadium-dioxide-containing fine particle dispersion liquid 2 was maintained at 20° C., when the initial volume of the vanadium-dioxide-containing fine particle dispersion liquid 2 was regarded as 100%, the dispersion liquid 2 was concentrated up to 20% by volume, and then ethyl alcohol was added thereto to have 100% by volume. Next, this dispersion liquid was concentrated up to 20% by volume again, methyl ethyl ketone was then added as a solvent thereto to have 100% by volume, and the solvent replacement treatment was performed two times to prepare a solvent-based vanadium-dioxide-containing fine particle dispersion liquid 3 having a particle concentration of 3% by mass.

The water content in the prepared vanadium-dioxide-containing fine particle dispersion liquid 3 was measured by a Karl Fischer's method, and as a result, found to be 4.05% by mass.

(Preparation of Coating Liquid 2 for Forming Optical Functional Layer)

A solvent-based coating liquid 2 for forming an optical functional layer was prepared by sequentially adding, mixing, and dissolving the following respective constituent materials.

| | |
|---|---|
| 3% by mass vanadium-dioxide-containing fine particle dispersion liquid 3 (solvent: methyl ethyl ketone) | 28 parts by mass |
| 5% by mass hydrophobic binder resin (solvent: methyl ethyl ketone, solute: VYLON 200 (amorphous polyester resin, manufactured by TOYOBO CO., LTD.)) | 60 parts by mass |

(Formation of Optical Functional Layer)

The prepared coating liquid 2 for forming an optical functional layer was wet-applied onto a transparent substrate of a polyethylene terephthalate film (A4300 manufactured by TOYOBO CO., LTD., both-sided easily adhesive layer) having a thickness of 50 μm by using an extrusion coater under the condition that the layer thickness after drying became 1.5 μm. Then, the substrate was dried by blowing a hot air at 110° C. for 2 minutes to form an optical functional layer, thereby producing an optical film 50 with the configuration described in FIG. 1.

[Production of Optical Film 51]

(Preparation of Vanadium-Dioxide-Containing Fine Particle Dispersion Liquid 4)

The dispersion liquid 3 was further concentrated up to 20% by volume by using the same solvent replacement treatment device as in the preparation of the vanadium-dioxide-containing fine particle dispersion liquid 3, methyl ethyl ketone was then added thereto to have 100% by volume, and the solvent replacement treatment was performed three times to prepare a solvent-based vanadium-dioxide-containing fine particle dispersion liquid 4 having a particle concentration of 3% by mass.

The water content in the prepared vanadium-dioxide-containing fine particle dispersion liquid 4 was measured by a Karl Fischer's method, and as a result, found to be 0.84% by mass.

(Preparation of Coating Liquid for Forming Optical Functional Layer and Formation of Optical Functional Layer)

An optical film 51 was produced in the same manner as in the production of the optical film 50, except that preparation of a coating liquid for forming an optical functional layer and formation of an optical functional layer were performed by using the prepared vanadium-dioxide-containing fine particle dispersion liquid 4 instead of the vanadium-dioxide-containing fine particle dispersion liquid 3.

[Production of Optical Film 52]

(Preparation of Vanadium-Dioxide-Containing Fine Particle Dispersion Liquid 5)

The dispersion liquid 4 was further concentrated up to 20% by volume by using the same solvent replacement treatment device as in the preparation of the vanadium-dioxide-containing fine particle dispersion liquid 4, methyl ethyl ketone was then added thereto to have 100% by volume, and the solvent replacement treatment was performed four times to prepare a solvent-based vanadium-dioxide-containing fine particle dispersion liquid 5 having a particle concentration of 3% by mass.

The water content in the prepared vanadium-dioxide-containing fine particle dispersion liquid 5 was measured by a Karl Fischer's method, and as a result, found to be 0.03% by mass.

(Preparation of Coating Liquid for Forming Optical Functional Layer and Formation of Optical Functional Layer)

An optical film 52 was produced in the same manner as in the production of the optical film 50, except that preparation of a coating liquid for forming an optical functional layer and formation of an optical functional layer were performed by using the prepared vanadium-dioxide-containing fine particle dispersion liquid 5 instead of the vanadium-dioxide-containing fine particle dispersion liquid 3.

[Production of Optical Film 53]

(Preparation of Vanadium-Dioxide-Containing Fine Particle Dispersion Liquid 6)

The dispersion liquid 2 was further concentrated up to 20% by volume by using the same solvent replacement treatment device as in the preparation of the vanadium-dioxide-containing fine particle dispersion liquid 5, methyl ethyl ketone was then added thereto to have 100% by volume, and the solvent replacement treatment was performed five times to prepare a solvent-based vanadium-dioxide-containing fine particle dispersion liquid 6 having a particle concentration of 3% by mass.

The water content in the prepared vanadium-dioxide-containing fine particle dispersion liquid 6 was measured by a Karl Fischer's method, and as a result, found to be 0.008% by mass.

(Preparation of Coating Liquid for Forming Optical Functional Layer and Formation of Optical Functional Layer)

An optical film 53 was produced in the same manner as in the production of the optical film 50, except that preparation of a coating liquid for forming an optical functional layer and formation of an optical functional layer were performed by using the prepared vanadium-dioxide-containing fine particle dispersion liquid 6 instead of the vanadium-dioxide-containing fine particle dispersion liquid 3.

[Production of Optical Film 54]

(Preparation of Vanadium-Dioxide-Containing Fine Particle Dispersion Liquid 7)

The concentrating operation was performed by using the same solvent replacement treatment device described in FIG. 4 as described above while the prepared vanadium-dioxide-containing fine particle dispersion liquid 2 was maintained at 20° C., when the initial volume of the vanadium-dioxide-containing fine particle dispersion liquid 2 was regarded as 100%, the dispersion liquid 2 was concentrated up to 30% by volume, and then ethyl alcohol was added thereto to have 100% by volume. Next, this dispersion liquid was concentrated up to 30% by volume again, methyl ethyl ketone was then added as a solvent thereto to have 100% by volume, and the solvent replacement treatment was performed two times to prepare a solvent-based vanadium-dioxide-containing fine particle dispersion liquid 7 having a particle concentration of 3% by mass.

The water content in the prepared vanadium-dioxide-containing fine particle dispersion liquid 7 was measured by a Karl Fischer's method, and as a result, found to be 9.10% by mass.

(Preparation of Coating Liquid for Forming Optical Functional Layer and Formation of Optical Functional Layer)

An optical film 54 was produced in the same manner as in the production of the optical film 50, except that preparation of a coating liquid for forming an optical functional layer and formation of an optical functional layer were performed by using the prepared vanadium-dioxide-containing fine particle dispersion liquid 7 instead of the vanadium-dioxide-containing fine particle dispersion liquid 3.

[Production of Optical Film 55]

(Preparation of Vanadium-Dioxide-Containing Fine Particle Dispersion Liquid 8)

The concentrating operation was performed by using the same solvent replacement treatment device described in FIG. 4 as described above while the prepared vanadium-dioxide-containing fine particle dispersion liquid 2 was maintained at 20° C., when the initial volume of the vanadium-dioxide-containing fine particle dispersion liquid 2 was regarded as 100%, the dispersion liquid 2 was concentrated up to 28% by volume, ethyl alcohol was then added thereto to have 100% by volume, and the solvent replacement treatment was performed once to prepare a solvent-based vanadium-dioxide-containing fine particle dispersion liquid 8 having a particle concentration of 3% by mass.

The water content in the prepared vanadium-dioxide-containing fine particle dispersion liquid 8 was measured by a Karl Fischer's method, and as a result, found to be 28.10% by mass.

(Preparation of Coating Liquid for Forming Optical Functional Layer and Formation of Optical Functional Layer)

An optical film 55 was produced in the same manner as in the production of the optical film 50, except that preparation of a coating liquid for forming an optical functional layer and formation of an optical functional layer were performed by using the prepared vanadium-dioxide-containing fine particle dispersion liquid 8 instead of the vanadium-dioxide-containing fine particle dispersion liquid 3.

[Production of Optical Film 56]

(Preparation of Vanadium-Dioxide-Containing Fine Particle Dispersion Liquid 9)

The concentrating operation was performed by using the same solvent replacement treatment device described in FIG. 4 as described above while the prepared vanadium-dioxide-containing fine particle dispersion liquid 2 was maintained at 20° C., when the initial volume of the vanadium-dioxide-containing fine particle dispersion liquid 2 was regarded as 100%, the dispersion liquid 2 was concentrated up to 50% by volume, ethyl alcohol was then added thereto to have 100% by volume, and the solvent replacement treatment was performed once to prepare a solvent-based vanadium-dioxide-containing fine particle dispersion liquid 9 having a particle concentration of 3% by mass.

The water content in the prepared vanadium-dioxide-containing fine particle dispersion liquid 9 was measured by a Karl Fischer's method, and as a result, found to be 50.10% by mass.

(Preparation of Coating Liquid for Forming Optical Functional Layer and Formation of Optical Functional Layer)

An optical film 56 was produced in the same manner as in the production of the optical film 50, except that preparation of a coating liquid for forming an optical functional layer and formation of an optical functional layer were performed by using the prepared vanadium-dioxide-containing fine particle dispersion liquid 9 instead of the vanadium-dioxide-containing fine particle dispersion liquid 3.

[Production of Optical Film 57]

An optical film 57 was produced in the same manner as in the production of the optical film 51, except that an optical functional layer was formed by a coating liquid 3 for forming an optical functional layer prepared by using the same amount of polyvinyl butyral resin (abbreviation: PVB) instead of the amorphous polyester resin (VYLON 200) serving as a hydrophobic binder resin used in the preparation of the coating liquid for forming an optical functional layer.

(Preparation of Coating Liquid 3 for Forming Optical Functional Layer)

A solvent-based coating liquid 3 for forming an optical functional layer was prepared by sequentially adding, mixing, and dissolving the following respective constituent materials.

| | |
|---|---|
| 3% by mass vanadium-dioxide-containing fine particle dispersion liquid 4 (solvent: methyl ethyl ketone) | 28 parts by mass |
| 5% by mass hydrophobic binder resin (solvent: methyl ethyl ketone/toluene = 1/1, solute: polyvinyl butyral resin (S-LEC BX-1, manufactured by SEKISUI CHEMICAL CO., LTD.) | 60 parts by mass |

[Production of Optical Film 58]

An optical film 58 was produced in the same manner as in the production of the optical film 51, except that an optical functional layer was formed by a coating liquid 4 for forming an optical functional layer prepared by using the same amount of diacetylcellulose (abbreviation: DAC) instead of the amorphous polyester resin (VYLON 200) serving as a hydrophobic binder resin used in the preparation of the coating liquid for forming an optical functional layer.

(Preparation of Coating Liquid 4 for Forming Optical Functional Layer)

A solvent-based coating liquid 4 for forming an optical functional layer was prepared by sequentially adding, mixing, and dissolving the following respective constituent materials.

| | |
|---|---|
| 3% by mass vanadium-dioxide-containing fine particle dispersion liquid 4 (solvent: methyl ethyl ketone) | 28 parts by mass |
| 5% by mass hydrophobic binder resin (solvent: methyl ethyl ketone, solute: diacetylcellulose, degree of acetification = 55%, weight average molecular weight = 180,000) | 60 parts by mass |

[Production of Optical Film 59]

A vanadium-dioxide-containing fine particle dispersion liquid 12 was prepared in the same manner as in the preparation of the vanadium-dioxide-containing fine particle dispersion liquid 4 used in the production of the optical film 51, except that the solvent replacement treatment was performed by distillation under reduced pressure using an evaporator instead of the method using an ultrafiltration device described in FIG. 4, and then an optical film 59 was produced in the same manner as in the production of the optical film 51, except that the prepared vanadium-dioxide-containing fine particle dispersion liquid 12 was used.

[Production of Optical Film 60]

An optical film 60 was produced in the same manner as in the production of the optical film 51, except that an optical functional layer was formed by using a coating liquid 5 for forming an optical functional layer described below as a coating liquid for forming an optical functional layer.

(Preparation of Coating Liquid 5 for Forming Optical Functional Layer)

A solvent-based coating liquid 5 for forming an optical functional layer was prepared by sequentially adding, mixing, and dissolving the following respective constituent materials.

| | |
|---|---|
| 3% by mass vanadium-dioxide-containing fine particle dispersion liquid 4 (solvent: methyl ethyl ketone) | 28 parts by mass |
| 5% by mass hydrophobic ultraviolet curable binder resin (solvent: MEK, trade name V-7600B (manufactured by The Nippon Synthetic Chemical Industry Co., Ltd., polyfunctional urethane acrylate, abbreviation: UA) | 60 parts by mass |
| photopolymerization initiator: IRGACURE 184 (manufactured by BASF Japan Ltd.) | 0.15 part by mass |

(Formation of Optical Functional Layer)

The prepared coating liquid 5 for forming an optical functional layer was applied onto a transparent substrate of a polyethylene terephthalate film (A4300 manufactured by TOYOBO CO., LTD., both-sided easily adhesive layer) having a thickness of 50 μm by using a wire bar under the condition that the layer thickness after drying became 1.5 μm. Then, curing was carried out under air atmosphere under curing condition including an illuminance of 400 mJ/cm$^2$ using a UV curing device (using a high pressure mercury lamp) manufactured by EYE GRAPHICS Co., Ltd. Thereafter, drying at 80° C. was carried out for 3 minutes to produce the optical film 60.

[Production of Optical Film 61]

An optical film 61 was produced in the same manner, except that a vanadium-dioxide-containing fine particle dispersion liquid 14 prepared by the following method was used instead of the vanadium-dioxide-containing fine particle dispersion liquid 4 used in the production of the optical film 51.

(Preparation of Vanadium-Dioxide-Containing Fine Particle Dispersion Liquid 14)

A vanadium-dioxide-containing fine particle dispersion liquid 14 containing vanadium-dioxide-containing fine particles was prepared by a known synthesis method in the same manner, except that divanadium pentaoxide ($V_2O_5$) was used instead of ammonium vanadate ($NH_4VO_3$, manufactured by Wako Pure Chemical Industries, Ltd., special grade) serving as a supply source of vanadium atoms used in the preparation of the vanadium-dioxide-containing fine particle dispersion liquid 4.

[Production of Optical Film 62]

(Preparation of Vanadium-Dioxide-Containing Fine Particle Dispersion Liquid 15)

The concentrating operation was performed by using the solvent replacement treatment device having the same configuration described in FIG. 4 while the prepared aqueous vanadium-dioxide-containing fine particle dispersion liquid 2 was maintained at 20° C., when the initial volume of the vanadium-dioxide-containing fine particle dispersion liquid 2 was regarded as 100%, the dispersion liquid 2 was concentrated up to 20% by volume, and then ethyl alcohol was added thereto to have 100% by volume. Next, this dispersion liquid was concentrated up to 20% by volume again, methylene chloride was then added as a solvent thereto to have 100% by volume, the solvent replacement treatment was performed three times to prepare a solvent-based vanadium-dioxide-containing fine particle dispersion liquid 15 having a particle concentration of 3% by mass, and the solvent-based vanadium-dioxide-containing fine particle dispersion liquid 15 was filtered with Fine Met NF manufactured by Nippon Seisen Co., Ltd.

The water content in the prepared vanadium-dioxide-containing fine particle dispersion liquid 15 was measured by a Karl Fischer's method, and as a result, found to be 0.84% by mass.

(Preparation of Dope)

First, methylene chloride and ethanol described below were added into a pressure solution tank. Triacetyl cellulose (abbreviation: TAC) and the prepared vanadium-dioxide-containing fine particle dispersion liquid 15 were put into the pressure solution tank in which the organic solvent was put, under stirring. The resultant mixture was heated and stirred to dissolve triacetyl cellulose, and was filtered using Azumi filter paper No. 244 manufactured by Azumi Filter Paper Co., Ltd. to prepare a dope.

| <Composition of Dope> | |
|---|---|
| methylene chloride | 487 parts by mass |
| ethanol | 45 parts by mass |
| hydrophobic polymer resin: triacetyl cellulose (triacetyl cellulose synthesized from cotton linter, acetyl group substitution degree = 2.88, Mn = 150,000, Mw = 300,000) | 100 parts by mass |
| 3% by mass vanadium-dioxide-containing fine particle dispersion liquid 15 | 33 parts by mass |

(Film Formation)

An optical film 62 serving as a hybrid optical functional layer was produced using the prepared dope according to solution casting film formation methods described in JP 2014-095729 A and JP 2014-159082 A.

[Production of Optical Film 63]

(Preparation of Dope)

Methylene chloride described below was added into a pressure solution tank. A cycloolefin polymer (abbreviation: COP) and the prepared vanadium-dioxide-containing fine particle dispersion liquid 15 were put into the pressure solution tank in which the organic solvent was put, under stirring. The resultant mixture was heated and stirred to dissolve the cycloolefin polymer, and was filtered using Azumi filter paper No. 244 manufactured by Azumi Filter Paper Co., Ltd. to prepare a dope.

| <Composition of Dope> | |
|---|---|
| methylene chloride | 192 parts by mass |
| hydrophobic polymer resin: cycloolefin polymer (trade name: ARTON, manufactured by JSR Corporation) | 76.9 parts by mass |
| 3% by mass vanadium-dioxide-containing fine particle dispersion liquid 15 | 12.0 parts by mass |

(Film Formation)

An optical film 63 serving as a hybrid optical functional layer was produced using the prepared dope according to solution casting film formation methods described in JP 2014-095729 A and JP 2014-159082 A.

[Production of Optical Film 64]

(Preparation of Dope)

Methylene chloride described below was added into a pressure solution tank. Polymethylmethacrylate (abbreviation: PMMA) serving as an acrylic resin and the prepared vanadium-dioxide-containing fine particle dispersion liquid 15 were put into the pressure solution tank in which the organic solvent was put, under stirring. The resultant mixture was heated and stirred to dissolve polymethylmethacrylate, and was filtered using Azumi filter paper No. 244 manufactured by Azumi Filter Paper Co., Ltd. to prepare a dope.

| <Composition of Dope> | |
|---|---|
| methylene chloride | 192 parts by mass |
| hydrophobic polymer resin: acrylic resin (polymethylmethacrylate, trade name: VB-7103, manufactured by MITSUBISHI RAYON CO., LTD.) | 76.9 parts by mass |
| 3% by mass vanadium-dioxide-containing fine particle dispersion liquid 15 | 25.6 parts by mass |

(Film Formation)

An optical film 64 serving as a hybrid optical functional layer was produced using the prepared dope according to solution casting film formation methods described in JP 2014-095729 A and JP 2014-159082 A.

[Production of Optical Film 65]

An optical film 65 was produced in the same manner as in the production of the optical film 50, except that a vanadium-dioxide-containing fine particle dispersion liquid 16 described below was used instead of the vanadium-dioxide-containing fine particle dispersion liquid 3.

(Preparation of Vanadium-Dioxide-Containing Fine Particle Dispersion Liquid 16: Presence of Particle Drying Step)

13.7 g of vanadyl triisopropoxide was dissolved in 500 mL of isopropanol. 15 mL of ion-exchanged water was added to this solution, the resultant mixture was stirred at room temperature for 72 hours, and then the solvent (isopropanol) was removed. The residue was disintegrated, sintered at 400° C. for 2 hours, and subsequently sintered at 450° C. for 2 hours in hydrogen stream to obtain a vanadium-dioxide-containing fine particles by a calcination method.

Next, a powder of the obtained vanadium-dioxide-containing fine particles was added to methyl ethyl ketone to have a concentration of 3.0% by mass, thereby preparing a mixed liquid. The mixed liquid was dispersed again by performing an ultrasonic dispersion treatment for 5 minutes using an ultrasonic dispersion machine (UH-300 manufactured by SMT Co., Ltd.) to prepare a vanadium-dioxide-containing fine particle dispersion liquid 16.

(Production of Optical Film 70)

In the production of the optical film 43, a near-infrared light shielding layer 2 (near-infrared light reflection silver layer) described below was formed on the transparent substrate, the prepared coating liquid for forming an optical functional layer was then wet-applied thereonto by using an extrusion coater under the condition that the layer thickness after drying became 1.5 µm. Then, the substrate was dried by blowing a hot air at 110° C. for 2 minutes to sequentially form an optical functional layer, thereby producing an optical film 70 having a configuration in which the near-infrared light shielding layer 2 and the optical functional layer were laminated on the transparent substrate.

Incidentally, the number average particle diameter, the ratio of primary particles, the average value of the closest wall-to-wall distance, and the ratio of the number of the island regions having the closest wall-to-wall distance of 1,100 nm or more of the optical film 70 were obtained by methods described later, and found to have results as presented in Table 2.

(Formation of Near-Infrared Light Shielding Layer 2 (Near-Infrared Light Reflection Silver Layer))

An undercoat layer coating liquid 1 described below was prepared and then filtered with a polypropylene filter having a pore size of 0.4 μm, this undercoat layer coating liquid 1 was applied on the transparent substrate (thickness: 50 μm, polyethylene terephthalate film, A4300 manufactured by TOYOBO CO., LTD., both-sided easily adhesive layer) by using a micro gravure coater, the substrate was dried at 90° C., and then the coating film was cured by using an ultraviolet lamp at an illuminance of the irradiation unit of 100 mW/cm$^2$ and an irradiation amount of 100 mJ/cm$^2$, thereby forming an undercoat layer having a thickness of 1 μm.

Next, a silver thin film layer having a thickness of 15 nm was formed on the formed undercoat layer by using silver containing 2% by mass of gold as a sputtering target material and by a vacuum deposition method.

Then, an acrylic resin (OPSTAR 27535, manufactured by JSR Corporation) was applied onto the silver thin film layer by a micro gravure coater and dried at 90° C., and then the coating layer was cured by using an ultraviolet lamp at an illuminance of the irradiation unit of 100 mW/cm$^2$ and an irradiation amount of 100 mJ/cm$^2$ to form a hard coat layer having a thickness of 0.8 μm, thereby forming a near-infrared light shielding layer 2 (near-infrared light reflection silver layer).

<Preparation of Undercoat Layer Coating Liquid 1>

The undercoat layer coating liquid 1 was prepared by sequentially adding, stirring, and mixing the following respective constituent materials.

| | |
|---|---|
| acrylic monomer; KAYARAD DPHA (dipentaerythritol hexaacrylate, manufactured by Nippon Kayaku Co., Ltd.) | 200 parts by mass |
| IRGACURE 184 (manufactured by BASF Japan Ltd.) | 20 parts by mass |
| propylene glycol monomethyl ether | 110 parts by mass |
| ethyl acetate | 110 parts by mass |

[Production of Optical Film 71]

In the production of the optical film 43, a near-infrared light shielding layer 3 (reflection layer laminate body) described below was formed on the transparent substrate, the prepared coating liquid for forming an optical functional layer was wet-applied thereto by using an extrusion coater under the condition that the layer thickness after drying became 1.5 μm. Then, the substrate was dried by blowing a hot air at 110° C. for 2 minutes to sequentially form an optical functional layer, thereby producing an optical film 71 having a configuration illustrated in FIG. 3A in which the near-infrared light shielding layer 3 and the optical functional layer were laminated on the transparent substrate.

Incidentally, the number average particle diameter, the ratio of primary particles, the average value of the closest wall-to-wall distance, and the ratio of the number of the island regions having the closest wall-to-wall distance of 1,100 nm or more of the optical film 71 were obtained by methods described later, and found to have results as presented in Table 2.

(Formation of Near-Infrared Light Shielding Layer 3 (Reflection Layer Laminate Body))

<Preparation of Coating Liquid for Forming Reflection Layer>

<1> Preparation of Coating Liquid L1 for Low Refractive Index Layer 680 parts of 10% by mass aqueous solution of colloidal silica (silicon dioxide, manufactured by Nissan Chemical Industries, Ltd., SNOWTEX (registered trademark) OXS) serving as second metal oxide particles, 30 parts of 4.0% by mass aqueous solution of polyvinyl alcohol (manufactured by KURARAY CO., LTD., PVA-103: degree of polymerization of 300, degree of saponification of 98.5 mol %), and 150 parts of 3.0% by mass aqueous solution of boric acid were mixed and dispersed. Pure water was added thereto to prepare 1,000 parts of colloidal silica dispersion liquid L1 as a whole.

Next, the obtained colloidal silica dispersion liquid L1 was heated to 45° C., and 760 parts of 4.0% by mass aqueous solution of polyvinyl alcohol (manufactured by JAPAN VAM & POVAL CO., LTD., JP-45: degree of polymerization of 4,500, degree of saponification of 86.5 to 89.5 mol %) serving as a second water-soluble binder resin was sequentially added thereinto under stirring. Thereafter, 40 parts of 1% by mass aqueous solution of betaine-based surfactant (manufactured by Kawaken Fine Chemicals Co., Ltd., SOFTAZOLINE (registered trademark) LSB-R) was added thereto to prepare a coating liquid L1 for a low refractive index layer.

<2> Preparation of Coating Liquid L2 for Forming Low Refractive Index Layer

A coating liquid L2 for a low refractive index layer to be used for forming an outermost layer of a reflection layer laminate body was prepared in the same manner as in the preparation of the coating liquid L1 for a low refractive index layer, except that a solid content amount of silicon dioxide (colloidal silica) serving as second metal oxide particles was changed to 50% by mass.

<3> Preparation of Coating Liquid H1 for High Refractive Index Layer

<3.1> Preparation of Core-Shell Particles

<3.2> Preparation of Rutile-Type Titanium Oxide Constituting Core Portion

Titanium oxide hydrate was suspended in water to have a concentration of 100 g/L based on TiO$_2$, thereby preparing an aqueous suspension of titanium oxide. To 10 L (liter) of the suspension, 30 L of aqueous solution of sodium hydroxide (concentration: 10 mol/L) was added under stirring, and the resultant mixture was heated to 90° C. and aged for 5 hours. Next, the mixture was neutralized with hydrochloric acid and filtered, followed by washing with water.

Incidentally, in the above reaction (treatment), titanium oxide hydrate serving as a raw material was obtained by the thermal hydrolysis of an aqueous solution of titanium sulfate according to a known method.

The base-treated titanium compound was suspended in pure water to have a concentration of 20 g/L based on TiO$_2$. Into the suspension, citric acid was added under stirring in an amount of 0.4 mol % with respect to the amount of TiO$_2$. Thereafter, when the sol mixture was heated to reach 95° C., concentrated hydrochloric acid was added such that the concentration of hydrochloric acid became 30 g/L. The mixture was stirred for 3 hours while the liquid temperature was maintained at 95° C., thereby preparing a titanium oxide sol.

The pH and zeta potential of the titanium oxide sol obtained as described above were measured, and found that the pH at 25° C. was 1.4 and the zeta potential was +40 mV. In addition, the particle diameter measurement was performed by Zetasizer Nano manufactured by Malvern Instruments Ltd. and found that the degree of monodispersity was 16%.

Further, the titanium oxide sol was dried at 105° C. for 3 hours to obtain powder fine particles of titanium oxide. The powder fine particles were measured by X-ray diffraction with JDX-3530 model manufactured by JEOL Ltd. and found to be rutile-type titanium oxide fine particles. In addition, the volume average particle diameter of the fine particles was 10 nm.

Then, to 4 kg of pure water, 20.0% by mass of titanium oxide sol aqueous dispersion liquid containing the obtained rutile-type titanium oxide fine particles having a volume average particle diameter of 10 nm was added to obtain a sol serving as core particles.

<3.3> Preparation of Core-Shell Particles by Shell Coating

To 2 kg of pure water, 0.5 kg of 10.0% by mass titanium oxide sol aqueous dispersion liquid was added and the resultant mixture was heated to 90° C. Next, 1.3 kg of aqueous solution of silicic acid prepared to have a concentration of 2.0% by mass based on $SiO_2$ was gradually added and the resultant mixture was subjected to a heating treatment in an autoclave at 175° C. for 18 hours and further concentrated to obtain a sol (solid content concentration: 20% by mass) of core-shell particles (average particle diameter: 10 nm) containing titanium oxide having a rutile-type structure as core particles and $SiO_2$ as a coating layer.

<3.4> Preparation of Coating Liquid for Forming High Refractive Index Layer

A core-shell particle dispersion liquid H1 was prepared by mixing 28.9 parts of the above obtained sol (solid concentration: 20.0% by mass) containing core-shell particles as first metal oxide particles, 10.5 parts of 1.92% by mass aqueous solution of citric acid, 2.0 parts of 10% by mass aqueous solution of polyvinyl alcohol (manufactured by KURARAY CO., LTD., PVA-103: degree of polymerization of 300, degree of saponification of 98.5 mol %), and 9.0 parts of 3% by mass aqueous solution of boric acid.

Next, while the core-shell particle dispersion liquid H1 was stirred, 16.3 parts of pure water and 33.5 parts of 5.0% by mass aqueous solution of polyvinyl alcohol (manufactured by KURARAY CO., LTD., PVA-124: degree of polymerization of 2,400, degree of saponification of 98 to 99 mol %) serving as a first water-soluble binder were added. Further, 0.5 part of 1% by mass aqueous solution of betaine-based surfactant (manufactured by Kawaken Fine Chemicals Co., Ltd., SOFTAZOLINE (registered trademark) LSB-R) was added thereto and pure water was used to prepare 1,000 parts of coating liquid H1 for a high refractive index layer as a whole.

<Formation of Reflection Layer Laminate Body>

A reflection layer laminate body ML1 was produced according to the following method.

While the coating liquid L1 for a low refractive index layer, the coating liquid L2 for a low refractive index layer, and the coating liquid H1 for a high refractive index layer, which were prepared above, were maintained at 45° C., the coating liquids were applied, by using a slide hopper coater capable of multilayer coating, to one surface side of a polyethylene terephthalate film (manufactured by TOYOBO CO., LTD., Cosmo Shine A4300, both-side adhesion-facilitating treatment, abbreviation: PET) serving as a transparent substrate (2) of 50 μm in thickness heated to 45° C. such that a high refractive index layer H1 and low refractive index layers L1 and L2 each had a dry thickness of 147 nm, thereby forming a reflection layer laminate body (ML1).

Specifically, simultaneous multilayer coating was carried out for forming 17 layers having a configuration in which one surface of the transparent substrate (2) was the low refractive index layer L1 (T1), the high refractive index layer H1 (T2) was laminated thereon, 16 layers were formed by using this layer configuration in which eight low refractive index layers L1 and eight high refractive index layers H1 were alternately laminated, and the low refractive index layer L2 (Tn) having a silicon dioxide content ratio of 50% by mass was formed on the 16-th high refractive index layer H1.

Just after coating, the layers were set by blowing a cold air at 5° C. At this time, the time until nothing sticks to fingers upon contact with the surface (setting time) was 5 minutes.

After completion of setting, the layers were dried by blowing a hot air at 80° C. to form a reflection layer laminate body (ML1) formed of 17 layers on one surface of the PET film (2) and having a total thickness of 2.5 μm.

[Production of Optical Film 72]

In the production of the optical film 43, a near-infrared light shielding layer 4 (ITO thin film) described below was formed on the transparent substrate, the prepared coating liquid for forming an optical functional layer was wet-applied thereonto by using an extrusion coater under the condition that the layer thickness after drying became 1.5 μm. Then, the substrate was dried by blowing a hot air at 110° C. for 2 minutes to sequentially form an optical functional layer, thereby producing an optical film 72 in which the near-infrared light shielding layer 4 and the optical functional layer were laminated on the transparent substrate.

Incidentally, the number average particle diameter, the ratio of primary particles, the average value of the closest wall-to-wall distance, and the ratio of the number of the island regions having the closest wall-to-wall distance of 1,100 nm or more of the optical film 72 were obtained by methods described later, and found to have results as presented in Table 2.

(Formation of Near-Infrared Light Shielding Layer 4 (ITO Thin Film))

A coating liquid for a near-infrared light shielding layer 4 described below was applied onto the transparent substrate by a wire bar to have a (average) film thickness after drying of 4 μm, curing was then performed using a UV curing device manufactured by EYE GRAPHICS Co., Ltd. (using a high pressure mercury lamp) in air atmosphere under a curing condition of 400 mJ/cm$^2$, and then drying was performed under a drying condition of 80° C. for 3 minutes to form a near-infrared light shielding layer 4 (ITO thin film).

<Preparation of Coating Liquid for Near-Infrared Light Shielding Layer 4>

To 100 parts of V-7600B (UV curable hard coat material) manufactured by The Nippon Synthetic Chemical Industry Co., Ltd., 5 parts of IRGACURE 184 (manufactured by BASF Japan Ltd.) serving as a photopolymerization initiator and 100 parts of ITO powder (ultrafine particle ITO manufactured by Sumitomo Metal Mining Co., Ltd.) were added and diluted with methyl ethyl ketone as a solvent to prepare a coating liquid for a near-infrared light shielding layer 4 having a solid content of 30% by mass.

<<Production of Optical Film Laminated Glass>>

[Production of Optical Film Laminated Glasses 1 to 34, 41 to 43, 50 to 65, and 70 to 72]

The produced optical films 1 to 34, 41 to 43, 50 to 65, and 70 to 72 were pasted to glass plates having a thickness of 1.3 mm (size: 15 cm×20 cm) ("Glass Slide White Ground Edges" manufactured by Matsunami Glass Ind., Ltd.) by using a transparent adhesive sheet (LUCIACS CS9621T manufactured by Nitto Denko Corporation) to produce optical film laminated glasses 1 to 34, 41 to 43, 50 to 65, and 70 to 72.

[Production of Optical Film Laminated Glass 80]

A glass plate having a thickness of 1.3 mm and a size of 15 cm×20 cm without being provided with an optical film was used as an optical film laminated glass 80.

<<Measurement of Characteristic Values of Optical Film>>

Regarding each optical film produced above, the number average particle diameter of the vanadium-dioxide-containing fine particles in the optical functional layer and the primary particle ratio were measured according to the following methods.

The side surface of the optical functional layer constituting each optical film was trimmed by a microtome to expose the cross-section as illustrated in FIG. 1 or FIG. 2. Next, the exposed cross-section was captured using a transmission electron microscope (TEM) with a magnification of 10,000. The particle diameters of the whole vanadium-dioxide-containing fine particles present in a certain region of the captured cross-section were measured.

At this time, the number of the vanadium-dioxide-containing fine particles to be measured was set to 300. In the captured particles, as illustrated in FIG. 1 or FIG. 2, the primary particles that are single particles and secondary particles that are an aggregate of two or more particles are included, and the particle diameters of the primary particles $VO_S$ of vanadium dioxide are obtained by measuring the diameters of respective particles which are separated and independently present. In addition, regarding vanadium dioxide in which two or more particles are aggregated and present, the projected area of the entire aggregate was obtained, the projected area was converted into a circle, and the diameter thereof was used as the particle diameter.

The number average diameter (nm) of each diameter of primary particles and secondary particles obtained as described above was obtained. Then, regarding each particle measured above, the ratio of the number of primary particles with respect to the total number of particles (the ratio of primary particle described in Table 1 and Table 2 [% by number]) was obtained.

(Measurement of Average Value of Closest Wall-to-Wall Distance Between Island Regions)

For the closest wall-to-wall distance between the island regions, when an arbitrary direction on the surface of the optical film including the optical functional layer was regarded as 0°, the optical film was cut in a film thickness direction perpendicular to the optical film surfaces in directions of 0° and 90°, each cross-section was captured by a scanning electron microscope (S-4300, manufactured by Hitachi High-Technologies Corporation), total 40 island regions of each 20 island regions from the cross-section in the 0° direction and the cross-section in the 90° direction were randomly selected from the photograph by using image analysis software "Azo-kun (registered trademark)" (manufactured by Asahi Kasei Corporation) according to a distance-between-centroids method, centroids of two most closest island regions among respective island regions were connected by a straight line, a distance between outer edges (walls) facing each other was obtained as the closest wall-to-wall distance between the island regions, and the average value of the total 40 island regions was regarded as the average value of the closest wall-to-wall distance between the island regions.

<<Evaluation of Optical Film and Optical Film Laminated Glass>>

[Evaluation of Storage Stability: Evaluation of Optical Film]

Each obtained optical film was cut into five pieces each having a size of 10 cm square, the following accelerated stability test was performed thereon for evaluation of storage stability, and then samples after the accelerated stability test were prepared. Then, the evaluation of storage stability was performed according to the following evaluation ranks.

(Accelerated Stability Test)

Three acceleration testers were prepared and were adjusted to 85° C. (without humidifying), −20° C., and 60° C.-relative humidity of 80% respectively, and each optical film was subjected to an operation of (85° C.: for 1 hour) →(−20° C.: for 1 hour)→(60° C.-relative humidity of 80%: for 1 hour). This operation was repeated three times. Incidentally, the movement between respective acceleration testers was set to 1 minute. Thereafter, the optical film was irradiated with light at an irradiance of 1 kW/m² for 15 hours by using a metal halide lamp type weatherability tester (M6T manufactured by Suga Test Instruments Co., Ltd.). This operation was regarded as one cycle, and the accelerated stability test of three cycles in total was performed. Incidentally, when cracks and film peeling do not occur, it is considered that storage stability is favorable.

(Evaluation Ranks)

5: Occurrence of cracks and film peeling with a size of 0.5 mm or more is not recognized in all five optical films.

4: The total number of cracks and film peeling with a size of 0.5 mm or more and less than 3 mm that occur in five optical films is one or more and two or less.

3: The total number of cracks and film peeling with a size of 0.5 mm or more and less than 3 mm that occur in five optical films is three or more and five or less.

2: The total number of cracks and film peeling with a size of 0.5 mm or more and less than 3 mm that occur in five optical films is six or more and ten or less.

1: The total number of cracks and film peeling with a size of 0.5 mm or more and less than 3 mm that occur in five optical films is 11 or more or the total number of cracks and film peeling with a size of 3 mm or more that occur in five optical films is one or more.

(Measurement of Visible Light Transmittance)

The visible light transmittance was measured at the same time as measurement of the haze, and as a result, the present invention and comparative examples all had a visible light transmittance of 50% or more. When the transmittance is low, a change rate to be described later tends to be estimated to large, but the influence of the change rate on all samples of the present invention and comparative examples is small.

[Evaluation of Heat Shielding Property]

The following heat shielding property in environment like summer and heat shielding property in environment like winter were evaluated using the produced optical film laminated glasses 1 to 34, 41 to 43, 50 to 65, and 70 to 72, and the thermochromic properties of the optical films were determined.

(Evaluation of Heat Shielding Property in Environment Like Summer)

<Measurement Environment>

Measurement environment: An optical film laminated glass was disposed on the wall surface of environmental test laboratory (room temperature: 28° C.) such that the inner side was the optical film, and an environmental chamber that assumed the inside of a room of Cool Biz in Japan was used.

A halogen lamp with 150 W was lit from a position separated from the outside, at which the optical film laminated glass was disposed, of the environmental test laboratory by 50 cm, assuming the sun in summer.

Further, the laminated glass was heated to 70° C. by a thermocouple, assuming that the optical film laminated glass was heated by accumulation of sunlight irradiation.

<Evaluation 1>

A thermometer was disposed at a position separated from the optical film laminated glass in the environmental test laboratory by 1 m, the temperature after 3 hours under the above conditions was measured, and the evaluation of the heat shielding property was performed according to the following criteria (ranks).

5: The temperature after 1 hour is lower than 29° C. and an increase in temperature caused by external light is almost not recognized.

4: The temperature after 1 hour is 29° C. or higher and 32° C. or lower.

3: The temperature after 1 hour is 32° C. or higher and 34° C. or lower.

2: The temperature after 1 hour is 34° C. or higher and 36° C. or lower.

1: The temperature after 1 hour is 36° C. or higher and the environment is severe.

(Evaluation of Heat Shielding Property in Environment Like Winter)

<Measurement Environment>

Measurement environment: An optical film laminated glass was disposed on the wall surface of environmental test laboratory (room temperature: 20° C.) such that the inner side was the optical film, and an environmental chamber that assumed the inside of a room of Warm Biz in Japan was used.

A halogen lamp with 100 W was lit from a position separated from the outside, at which the optical film laminated glass was disposed, of the environmental test laboratory by 50 cm, assuming the sun in winter.

<Evaluation 2>

A thermometer was disposed at a position separated from the optical film laminated glass in the environmental test laboratory by 1 m, the temperature after 3 hours under the above conditions was measured, and the evaluation of the heat shielding property was performed according to the following criteria (ranks).

5: The temperature after 1 hour is 26° C. or higher and thermal energy due to external light is appropriately infiltrated.

4: The temperature after 1 hour is 24° C. or higher and lower than 26° C.

3: The temperature after 1 hour is 22° C. or higher and 24° C. or lower.

2: The temperature after 1 hour is 21° C. or higher and 22° C. or lower.

1: A lot of near-infrared light is unconditionally shielded and the temperature after 1 hour is lower than 21° C.

[Evaluation of Haze]

The haze (%) of each optical film laminated glass produced above was measured at room temperature (25° C.) by using a haze meter (manufactured by Nippon Denshoku Industries Co., Ltd., NDH2000), and the evaluation of haze was performed according to the following criteria (ranks).

5: The haze is less than 2.0%.

4: The haze is 2.0% or more and less than 3.0%.

3: The haze is 3.0% or more and less than 5.0%

2: The haze is 5.0% or more and less than 8.0%

1: The haze is 8.0% or more.

The results obtained above are presented in Table 1 and Table 2.

TABLE 1

| Optical film (optical film laminated glass) No. | Number average particle diameter [nm] | Ratio of primary particles [% by number] | Average value of closest wall-to-wall distance [nm] | Ratio of closest wall-to-wall distance of 1,100 nm or more (%) | Transparent substrate | Type of binder resin | Evaluation Storage stability | Shielding property Environment like summer | Shielding property Environment like winter | Haze | Remarks |
|---|---|---|---|---|---|---|---|---|---|---|---|
| 1 | 6 | 45 | 58 | 7.5 | PET | PVA-124 | 4 | 4 | 4 | 5 | Present Invention |
| 2 | 15 | 45 | 58 | 7.5 | PET | PVA-124 | 4 | 4 | 4 | 4 | Present Invention |
| 3 | 45 | 45 | 58 | 7.5 | PET | PVA-124 | 5 | 5 | 5 | 4 | Present Invention |
| 4 | 89 | 45 | 58 | 7.5 | PET | PVA-124 | 5 | 5 | 5 | 4 | Present Invention |
| 5 | 112 | 45 | 58 | 7.5 | PET | PVA-124 | 4 | 5 | 5 | 4 | Present Invention |
| 6 | 145 | 45 | 58 | 7.5 | PET | PVA-124 | 4 | 4 | 5 | 4 | Present Invention |
| 7 | 189 | 45 | 58 | 7.5 | PET | PVA-124 | 4 | 4 | 4 | 4 | Present Invention |
| 8 | 200 | 45 | 58 | 7.5 | PET | PVA-124 | 4 | 3 | 4 | 3 | Present Invention |
| 9 | 201 | 45 | 58 | 7.5 | PET | PVA-124 | 2 | 3 | 3 | 2 | Comparative Example |
| 10 | 250 | 45 | 58 | 7.5 | PET | PVA-124 | 2 | 3 | 3 | 1 | Comparative Example |
| 11 | 125 | 21 | 104 | 7.5 | PET | PVA-124 | 5 | 3 | 3 | 3 | Present Invention |
| 12 | 125 | 25 | 104 | 7.5 | PET | PVA-124 | 5 | 4 | 4 | 4 | Present Invention |
| 13 | 125 | 35 | 104 | 7.5 | PET | PVA-124 | 5 | 4 | 4 | 5 | Present Invention |
| 14 | 125 | 46 | 104 | 7.5 | PET | PVA-124 | 5 | 4 | 4 | 5 | Present Invention |
| 15 | 125 | 69 | 104 | 7.5 | PET | PVA-124 | 5 | 4 | 4 | 5 | Present Invention |
| 16 | 125 | 70 | 104 | 7.5 | PET | PVA-124 | 4 | 4 | 4 | 5 | Present Invention |
| 17 | 125 | 95 | 104 | 7.5 | PET | PVA-124 | 4 | 4 | 4 | 3 | Present Invention |
| 18 | 125 | 72 | 58 | 7.5 | PET | PVA-124 | 5 | 4 | 4 | 5 | Present Invention |
| 19 | 125 | 72 | 104 | 7.5 | PET | PVA-124 | 5 | 5 | 4 | 5 | Present Invention |
| 20 | 125 | 72 | 254 | 7.5 | PET | PVA-124 | 4 | 4 | 5 | 5 | Present Invention |
| 21 | 125 | 72 | 405 | 7.5 | PET | PVA-124 | 5 | 4 | 4 | 5 | Present Invention |
| 22 | 125 | 72 | 578 | 7.5 | PET | PVA-124 | 4 | 4 | 4 | 5 | Present Invention |
| 23 | 125 | 72 | 634 | 7.5 | PET | PVA-124 | 4 | 4 | 5 | 5 | Present Invention |
| 24 | 125 | 72 | 789 | 7.5 | PET | PVA-124 | 4 | 4 | 5 | 5 | Present Invention |
| 25 | 125 | 72 | 895 | 7.5 | PET | PVA-124 | 4 | 4 | 5 | 5 | Present Invention |
| 26 | 125 | 72 | 958 | 7.5 | PET | PVA-124 | 4 | 4 | 5 | 5 | Present Invention |
| 27 | 125 | 72 | 1000 | 7.5 | PET | PVA-124 | 4 | 4 | 4 | 5 | Present Invention |
| 28 | 125 | 72 | 1007 | 7.5 | PET | PVA-124 | 4 | 5 | 2 | 5 | Comparative Example |
| 29 | 125 | 72 | 104 | 5.1 | PET | PVA-124 | 4 | 5 | 4 | 5 | Present Invention |
| 30 | 125 | 72 | 104 | 7.7 | PET | PVA-124 | 4 | 5 | 4 | 5 | Present Invention |
| 31 | 125 | 72 | 104 | 9.1 | PET | PVA-124 | 4 | 5 | 5 | 5 | Present Invention |
| 32 | 125 | 72 | 104 | 9.9 | PET | PVA-124 | 4 | 5 | 5 | 5 | Present Invention |
| 33 | 125 | 72 | 104 | 10.2 | PET | PVA-124 | 3 | 3 | 2 | 5 | Comparative Example |
| 34 | 125 | 72 | 104 | 10.7 | PET | PVA-124 | 2 | 3 | 2 | 5 | Comparative Example |

TABLE 2

| Optical film (optical film laminated glass) No. | Number average particle diameter [nm] | Ratio of primary particles [% by number] | Average value of closest wall-to-wall distance [nm] | Ratio of closest wall-to-wall distance of 1,100 nm or more (%) | Transparent substrate | Type of binder resin |
|---|---|---|---|---|---|---|
| 41 | 45 | 45 | 58 | 7.5 | PET | PVP |
| 42 | 45 | 45 | 58 | 7.5 | PET | PHEA |
| 43 | 45 | 45 | 58 | 7.5 | PET | PVA-217 |
| 50 | 53 | 67 | 58 | 7.5 | PET | Polyester |
| 51 | 41 | 75 | 58 | 7.5 | PET | Polyester |
| 52 | 39 | 78 | 58 | 7.5 | PET | Polyester |
| 53 | 38 | 79 | 58 | 7.5 | PET | Polyester |
| 54 | 95 | 55 | 58 | 7.5 | PET | Polyester |
| 55 | 130 | 35 | 58 | 7.5 | PET | Polyester |
| 56 | 190 | 10 | 58 | 7.5 | PET | Polyester |
| 57 | 42 | 73 | 58 | 7.5 | PET | PVB |
| 58 | 38 | 77 | 58 | 7.5 | PET | DAC |
| 59 | 39 | 76 | 58 | 7.5 | PET | Polyester |
| 60 | 37 | 77 | 58 | 7.5 | PET | UA |
| 61 | 35 | 78 | 58 | 7.5 | PET | Polyester |
| 62 | 36 | 80 | 58 | 7.5 | — | TAC |
| 63 | 35 | 81 | 58 | 7.5 | — | COP |
| 64 | 35 | 81 | 58 | 7.5 | — | PMMA |
| 65 | 630 | 25 | 58 | 7.5 | PET | Polyester |
| 70 | 45 | 45 | 58 | 7.5 | PET | PVA-217 |
| 71 | 45 | 45 | 58 | 7.5 | PET | PVA-217 |
| 72 | 45 | 45 | 58 | 7.5 | PET | PVA-217 |
| 80 | — | — | — | — | — | — |

| Optical film (optical film laminated glass) No. | Storage stability | Evaluation Shielding property | | Haze | Remarks |
| | | Environment like summer | Environment like winter | | |
|---|---|---|---|---|---|
| 41 | 5 | 5 | 5 | 4 | Present Invention |
| 42 | 4 | 5 | 4 | 4 | Present Invention |
| 43 | 5 | 5 | 5 | 4 | Present Invention |
| 50 | 5 | 4 | 4 | 5 | Present Invention |
| 51 | 5 | 4 | 4 | 5 | Present Invention |
| 52 | 5 | 4 | 4 | 5 | Present Invention |
| 53 | 5 | 5 | 5 | 5 | Present Invention |
| 54 | 4 | 5 | 4 | 5 | Present Invention |
| 55 | 4 | 3 | 4 | 4 | Present Invention |
| 56 | 4 | 3 | 3 | 3 | Present Invention |
| 57 | 5 | 4 | 4 | 4 | Present Invention |
| 58 | 4 | 5 | 4 | 4 | Present Invention |
| 59 | 5 | 5 | 4 | 4 | Present Invention |
| 60 | 5 | 4 | 4 | 4 | Present Invention |
| 61 | 5 | 4 | 4 | 4 | Present Invention |
| 62 | 4 | 4 | 4 | 4 | Present Invention |
| 63 | 4 | 4 | 4 | 4 | Present Invention |
| 64 | 4 | 4 | 4 | 4 | Present Invention |
| 65 | 3 | 1 | 1 | 2 | Comparative Example |
| 70 | 5 | 5 | 5 | 3 | Present Invention |
| 71 | 5 | 5 | 5 | 3 | Present Invention |
| 72 | 5 | 5 | 5 | 4 | Present Invention |
| 80 | — | 1 | 2 | 5 | Comparative Example |

INDUSTRIAL APPLICABILITY

As described above, the present invention is suitable for providing an optical film which has thermochromic properties that a near-infrared light shielding ratio can be controlled according to temperature environment and which has a low haze and has excellent crack resistance and adhesiveness even when the optical film is used over a long period of time, and a method for producing the same.

REFERENCE SIGNS LIST

1 OPTICAL FILM
2 TRANSPARENT SUBSTRATE
3 OPTICAL FUNCTIONAL LAYER
2+3 HYBRID OPTICAL FUNCTIONAL LAYER
4 NEAR-INFRARED LIGHT SHIELDING LAYER
10 SOLVENT REPLACEMENT TREATMENT DEVICE
11 PREPARATION CONTAINER
12 DISPERSION LIQUID CONTAINING VANADIUM-DIOXIDE-CONTAINING FINE PARTICLES
13 CIRCULATION LINE
14 CIRCULATION PUMP
15 ULTRAFILTRATION UNIT
16 DISCHARGE PORT
17 SOLVENT STOCK CONTAINER
18 SOLVENT
19 SOLVENT SUPPLY LINE
B1, B2 BINDER RESIN

VO$_S$ PRIMARY PARTICLES OF VANADIUM-DIOXIDE-CONTAINING FINE PARTICLES
VO$_M$ SECONDARY PARTICLES OF VANADIUM-DIOXIDE-CONTAINING FINE PARTICLES

The invention claimed is:

1. An optical film comprising an optical functional layer containing at least vanadium-dioxide-containing fine particles and a binder resin, wherein
the optical functional layer has a sea-island structure including a sea region formed by the binder resin and island regions formed by the vanadium-dioxide-containing fine particles,
a number average particle diameter of total particles including primary particles and secondary particles of the vanadium-dioxide-containing fine particles is 200 nm or less, and
an average value of a closest wall-to-wall distance between the island regions is in a range of 1 to 1,000 nm, and the number of the island regions having the closest wall-to-wall distance of 1,100 nm or more is 10% by number or less with respect to the total number of the island regions.

2. The optical film according to claim 1, wherein the vanadium-dioxide-containing fine particles are vanadium-dioxide-containing fine particles prepared by an aqueous synthesis method and the binder resin is an aqueous binder resin.

3. The optical film according to claim 1, wherein the vanadium-dioxide-containing fine particles are vanadium-dioxide-containing fine particles prepared by an aqueous synthesis method and the binder resin is a hydrophobic binder resin.

4. The optical film according to claim 1, further comprising a near-infrared light shielding layer having a function of shielding at least a part of light in a wavelength range of 700 to 1,000 nm in addition to the optical functional layer.

5. The optical film according to claim 1, wherein a ratio of the number of primary particles of the vanadium-dioxide-containing fine particles in the optical functional layer is 25% by number or more of the number of total particles.

6. The optical film according to claim 5, wherein the vanadium-dioxide-containing fine particles are vanadium-dioxide-containing fine particles prepared by an aqueous synthesis method and the binder resin is an aqueous binder resin.

7. The optical film according to claim 5, wherein the vanadium-dioxide-containing fine particles are vanadium-dioxide-containing fine particles prepared by an aqueous synthesis method and the binder resin is a hydrophobic binder resin.

8. The optical film according to claim 5, further comprising a near-infrared light shielding layer having a function of shielding at least a part of light in a wavelength range of 700 to 1,000 nm in addition to the optical functional layer.

9. A method for producing an optical film, the method comprising a step of forming an optical functional layer containing at least vanadium-dioxide-containing fine particles and a binder resin, wherein
in the step,
the optical functional layer has a sea-island structure including a sea region formed by the binder resin and island regions formed by the vanadium-dioxide-containing fine particles,
a number average particle diameter of total particles including primary particles and secondary particles of the vanadium-dioxide-containing fine particles is 200 nm or less, and
an average value of a closest wall-to-wall distance between the island regions is 1 to 1,000 nm, and the number of the island regions having the closest wall-to-wall distance of 1,100 nm or more is adjusted to 10% by number or less with respect to the total number of the island regions.

10. The method for producing an optical film according to claim 9, wherein vanadium-dioxide-containing fine particles prepared by an aqueous synthesis method are used as the vanadium-dioxide-containing fine particles and the binder resin is an aqueous binder resin.

11. The method for producing an optical film according to claim 10, wherein the vanadium-dioxide-containing fine particles are prepared as an aqueous dispersion liquid containing vanadium-dioxide-containing fine particles by the aqueous synthesis method, an aqueous coating liquid for forming an optical functional layer is prepared by mixing, without going through a dried state, the aqueous dispersion liquid with an aqueous binder resin solution in which at least the aqueous binder resin is dissolved in an aqueous solvent, and the coating liquid for forming an optical functional layer is applied onto a transparent substrate by a wet coating method and then dried to produce an optical film.

12. The method for producing an optical film according to claim 9, wherein vanadium-dioxide-containing fine particles prepared by an aqueous synthesis method are used as the vanadium-dioxide-containing fine particles, and
a hydrophobic binder resin is used as the binder resin.

13. The method for producing an optical film according to claim 12, wherein a resin polymerized in a curing treatment step by using a monomer constituting the hydrophobic binder resin is used as the hydrophobic binder resin.

14. The method for producing an optical film according to claim 12, wherein the vanadium-dioxide-containing fine particles are prepared as an aqueous dispersion liquid containing vanadium-dioxide-containing fine particles by the aqueous synthesis method and then the aqueous dispersion liquid is prepared as a solvent dispersion liquid containing vanadium-dioxide-containing fine particles by a solvent replacement step without the vanadium-dioxide-containing fine particles going through a dried state.

15. The method for producing an optical film according to claim 14, wherein the solvent replacement step includes:
a concentrating step of a dispersion liquid containing vanadium-dioxide-containing fine particles; and
a solvent dilution step of a concentrated liquid obtained in the concentrating step, and
the solvent replacement step is a step of preparing a solvent dispersion liquid containing vanadium-dioxide-containing fine particles by repeating treatment operations in the concentrating step and the solvent dilution step two or more times.

16. The method for producing an optical film according to claim 15, wherein a concentrating means used in the concentrating step of a dispersion liquid containing vanadium-dioxide-containing fine particles is an ultrafiltration method.

17. The method for producing an optical film according to claim 14, wherein the solvent dispersion liquid containing vanadium-dioxide-containing fine particles prepared by the solvent replacement step contains water in a range of 0.1 to 5.0% by mass.

18. The method for producing an optical film according to claim 14, wherein a coating liquid for forming an optical functional layer which contains the solvent dispersion liquid containing vanadium-dioxide-containing fine particles prepared by the solvent replacement step and a hydrophobic binder resin is prepared, and the coating liquid for forming an optical functional layer is applied onto a transparent substrate and then dried to form an optical functional layer.

19. The method for producing an optical film according to claim 14, wherein a dope for forming an optical functional layer which contains the solvent dispersion liquid containing vanadium-dioxide-containing fine particles prepared by the solvent replacement step and a hydrophobic binder resin is prepared, and the dope for forming an optical functional layer is used to form an optical functional layer by a solution casting method.

20. The method for producing an optical film according to claim 9, wherein a near-infrared light shielding layer having a function of shielding at least a part of light in a wavelength range of 700 to 1,000 nm is formed in addition to the optical functional layer.

\* \* \* \* \*